US012101652B2

(12) United States Patent
Campos et al.

(10) Patent No.: US 12,101,652 B2
(45) Date of Patent: Sep. 24, 2024

(54) AD-HOC WIRELESS MESH NETWORK SYSTEM AND METHODOLOGY FOR FAILURE REPORTING AND EMERGENCY COMMUNICATIONS

(71) Applicant: CABLE TELEVISION LABORATORIES, INC., Louisville, CO (US)

(72) Inventors: Luis Alberto Campos, Louisville, CO (US); Bernardo Huberman, Palo Alto, CA (US); Jason W. Rupe, Lafayette, CO (US); Martha Lurie Lyons, Sunnyvale, CA (US); Philip Rosenberg-Watt, Louisville, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 99 days.

(21) Appl. No.: 16/582,925

(22) Filed: Sep. 25, 2019

(65) Prior Publication Data
US 2020/0022005 A1    Jan. 16, 2020

Related U.S. Application Data

(63) Continuation-in-part of application No. 16/265,926, filed on Feb. 1, 2019, now abandoned, and a
(Continued)

(51) Int. Cl.
*H04W 24/04* (2009.01)
*H04L 41/0668* (2022.01)
(Continued)

(52) U.S. Cl.
CPC ......... *H04W 24/04* (2013.01); *H04L 41/0668* (2013.01); *H04L 41/0686* (2013.01); *H04L 45/22* (2013.01); *H04W 40/22* (2013.01); *H04W 76/50* (2018.02); *H04W 84/22* (2013.01); *H04W 88/04* (2013.01)

(58) Field of Classification Search
CPC ............. H04L 43/0876; H04L 43/0811; H04L 45/22; H04L 41/0686; H04L 41/5009; H04L 41/0668; H04W 24/04; H04W 76/50; H04W 40/22
See application file for complete search history.

(56) References Cited

U.S. PATENT DOCUMENTS

| | | | |
|---|---|---|---|
| 6,011,781 A * | 1/2000 | Bell | H04L 12/44 370/254 |
| 7,245,635 B2 * | 7/2007 | Mo | H04L 43/0876 370/468 |

(Continued)

*Primary Examiner* — Redentor Pasia
(74) *Attorney, Agent, or Firm* — Cozen O'Connor

(57) ABSTRACT

An ad-hoc wireless network is implemented by a plurality of wireless access points to detect and report failure of a concurrently implemented conventional network. The wireless access points collect and store network status information of the conventional network and send the network status information to a centralized emergency manager when failure of the conventional network is detected. The ad-hoc wireless network may also provide backhaul connectivity to a wireless access point of the failed conventional network for emergency communication.

26 Claims, 11 Drawing Sheets

Related U.S. Application Data continuation-in-part of application No. 16/252,358, filed on Jan. 18, 2019, now Pat. No. 11,025,484.

(60) Provisional application No. 62/787,851, filed on Jan. 3, 2019, provisional application No. 62/621,672, filed on Jan. 25, 2018, provisional application No. 62/618,740, filed on Jan. 18, 2018.

(51) Int. Cl.
| | | |
|---|---|---|
| *H04L 41/0686* | (2022.01) | |
| *H04L 45/00* | (2022.01) | |
| *H04W 40/22* | (2009.01) | |
| *H04W 76/50* | (2018.01) | |
| *H04W 84/22* | (2009.01) | |
| *H04W 88/04* | (2009.01) | |

(56) References Cited

U.S. PATENT DOCUMENTS

| | | | |
|---|---|---|---|
| 7,646,718 B1* | 1/2010 | Kondapalli | H04L 47/30 370/235.1 |
| 7,995,677 B2 | 8/2011 | Lee et al. | |
| 8,059,622 B2* | 11/2011 | Zhu | H04L 1/1854 370/338 |
| 8,660,497 B1 | 2/2014 | Zhang et al. | |
| 8,711,741 B1* | 4/2014 | Heidari | H04L 5/0064 370/286 |
| 8,797,844 B1* | 8/2014 | Strahle | H04L 45/28 370/219 |
| 9,615,266 B1 | 4/2017 | Cheadle et al. | |
| 9,681,490 B1 | 6/2017 | Kakinada et al. | |
| 10,313,894 B1 | 6/2019 | Desclos et al. | |
| 10,624,153 B2 | 4/2020 | Kakinada et al. | |
| 10,652,797 B2 | 5/2020 | Hahn et al. | |
| 10,694,562 B2 | 6/2020 | Su | |
| 11,025,531 B2* | 6/2021 | Cheng | H04L 45/24 |
| 2002/0159513 A1* | 10/2002 | Williams | H04L 12/5602 375/222 |
| 2004/0181811 A1 | 9/2004 | Rakib | |
| 2007/0040700 A1 | 2/2007 | Bachelder | |
| 2008/0005336 A1* | 1/2008 | Cohen | H04L 67/1085 709/227 |
| 2008/0192773 A1* | 8/2008 | Ou | H04L 47/805 370/468 |
| 2008/0192820 A1* | 8/2008 | Brooks | H04N 21/47202 375/240.02 |
| 2008/0219281 A1* | 9/2008 | Akin | H04L 47/125 370/419 |
| 2009/0013210 A1* | 1/2009 | McIntosh | H04L 41/0672 714/4.1 |
| 2009/0217326 A1 | 8/2009 | Hasek | |
| 2009/0315699 A1 | 12/2009 | Satish et al. | |
| 2010/0265826 A1* | 10/2010 | Khasnabish | H04L 47/122 370/237 |
| 2011/0064117 A1 | 3/2011 | Subramanian et al. | |
| 2012/0046030 A1 | 2/2012 | Siomina et al. | |
| 2012/0236801 A1* | 9/2012 | Krishnaswamy | H04W 76/16 370/329 |
| 2013/0135995 A1* | 5/2013 | Wu | H04W 36/06 370/252 |
| 2014/0143409 A1* | 5/2014 | Ali | H04L 41/0896 709/224 |
| 2015/0005024 A1 | 1/2015 | Fudickar et al. | |
| 2015/0029864 A1* | 1/2015 | Raileanu | H04L 43/0888 370/237 |
| 2015/0207610 A1* | 7/2015 | Medapalli | H04L 5/0092 370/336 |
| 2015/0223160 A1 | 8/2015 | Ho et al. | |
| 2016/0044732 A1* | 2/2016 | Den Hartog | H04L 45/00 370/225 |
| 2016/0066199 A1* | 3/2016 | Yeddala | H04W 28/10 370/252 |
| 2017/0013675 A1* | 1/2017 | Krauss | H04W 76/16 |
| 2017/0111813 A1* | 4/2017 | Townend | H04L 47/2483 |
| 2017/0150401 A1* | 5/2017 | Guo | H04L 47/125 |
| 2017/0303165 A1* | 10/2017 | Adams | H04L 43/0882 |
| 2018/0049069 A1* | 2/2018 | Yeddala | H04W 28/20 |
| 2018/0302832 A1 | 10/2018 | Huang et al. | |
| 2018/0351809 A1* | 12/2018 | Meredith | H04M 15/56 |
| 2018/0351867 A1* | 12/2018 | Dhanabalan | H04L 43/0864 |
| 2019/0037584 A1 | 1/2019 | Park et al. | |
| 2019/0069039 A1 | 2/2019 | Phillips | |
| 2019/0124563 A1* | 4/2019 | Zhang | H04W 16/32 |
| 2019/0132780 A1 | 5/2019 | Hahn et al. | |
| 2019/0334822 A1* | 10/2019 | Larumbe | H04L 41/147 |
| 2020/0288355 A1* | 9/2020 | Liu | H04W 36/30 |

* cited by examiner

AD-HOC WIRELESS MESH NETWORK SYSTEM AND METHODOLOGY FOR FAILURE REPORTING AND EMERGENCY COMMUNICATIONS

RELATED APPLICATIONS

This application is a continuation in part of U.S. patent application Ser. No. 16/252,358, filed Jan. 18, 2019, which claims priority to U.S. Patent Application Ser. No. 62/618, 740, filed Jan. 18, 2018. This application is also a continuation in part of U.S. patent application Ser. No. 16/265,926, filed Feb. 1, 2019, which claims priority to U.S. Patent Application Ser. No. 62/621,672, filed Jan. 25, 2018. This application also claims priority to U.S. Patent Application Ser. No. 62/787,851, filed Jan. 3, 2019. Each of the above reference applications is incorporated herein by reference in its entirety.

BACKGROUND

A network is made up of many network components, any of which can fail, disrupting operation of the network. Once failed, diagnose the network fault is difficult since communication is disrupted and useful diagnostic information is lost.

SUMMARY

Establishing a capability for cross-network communication to address emergencies and augment bandwidth across networks may allow operators to substantially reduce network service disruption & related costs.

With ubiquity of cell phones (e.g., cellular connected phones and devices) in the home and office, and cellular networks being mostly decoupled from home/office networks (e.g., DOCSIS networks with Wi-Fi), each network may serve as a backup communication path for the other network. To reduce use of cellular data when in range of the home/office network, users often connect their cell phones (e.g., smartphones) to their local home/office network (e.g., wired and wireless—Wi-Fi), which has an internet connection via a cable modem and service provider network (e.g., DOCSIS network). However, it is unheard of for devices connected to the home/office network to automatically configures a cell phone to allow an emergency communication path via the cellular network. For example, the cable modem may operate as a hub to allow devices connected to the home/office network (e.g., devices that primarily use the DOCSIS network to connect to the internet) to be able to use the cellular network when needed, such as when the DOCSIS network is impaired or when a bandwidth burst is needed.

In one embodiment, an ad-hoc wireless network method reports failure and provides emergency communication of a conventional network. A wireless access point is controlled to implement access to the conventional network over a wireless channel using a plurality of subcarriers. The wireless access point is also controlled to communicate, using an emergency channel having a plurality of emergency subcarrier groups, with at least one other wireless access point to form an ad-hoc wireless network. The wireless access point stores network status information of the conventional network received from the other wireless access point via the ad-hoc wireless network. The wireless access point receives, via the ad-hoc wireless network and from the other wireless access point, a distress message indicating failure of the conventional network, and sends an emergency reporting message including the network status information to a centralized emergency manager.

In another embodiment, a wireless access point includes at least one radio operable to simultaneously transmit one or more subcarriers of a channel and receive one or more subcarriers of the channel, a processor, and a memory communicatively coupled with the processor. The memory stores machine readable instructions that, when executed by the processor, control the processor to: control the radio to implement access to the conventional network over a wireless channel using a plurality of subcarriers; control the radio to communicate, using an emergency channel having a plurality of emergency subcarrier groups, with at least one other wireless access point to form an ad-hoc wireless network; store network status information of the conventional network received from the other wireless access point via the ad-hoc wireless network; receive, via the ad-hoc wireless network and from the other wireless access point, a distress message indicating failure of the conventional network; and send, from the wireless access point, an emergency reporting message including the network status information to a centralized emergency manager.

DETAILED DESCRIPTION OF THE EMBODIMENTS

When on or more components of a cable network malfunction or fail, service reliability of the cable network deteriorates and/or network services fail altogether. Such failure causes costly network service remediation and/or recovery efforts by operators. Current technology limits the ability to discern and resolve these network failures and doesn't provide information needed to affect appropriate repairs. Repairs to recover operation of the network are urgent; however, it isn't possible to always respond immediately to every network failure due to lack of information on the network status when the failure occurred.

The present embodiments solve this problem by developing a network-agnostic application to communicate data and metrics necessary to identify and address imminent network failure and/or network failure and its respective cause(s). This is achieved by forming an ad-hoc wireless network to communicate network status information (e.g., metrics, parameters, characteristics, etc.) of the failing network that may aid recovery. Further, the ad-hoc network may provide backhaul connectivity for emergency services until full operation of the failed network is restored. Conceptually a "slider bar" (e.g. tiered emergency services) of capabilities may be provided by the ad-hoc network based upon the detected network failure situation. Such functionality may be invaluable to network operators and/or telecommunication provider and users of related services.

Figure 1:
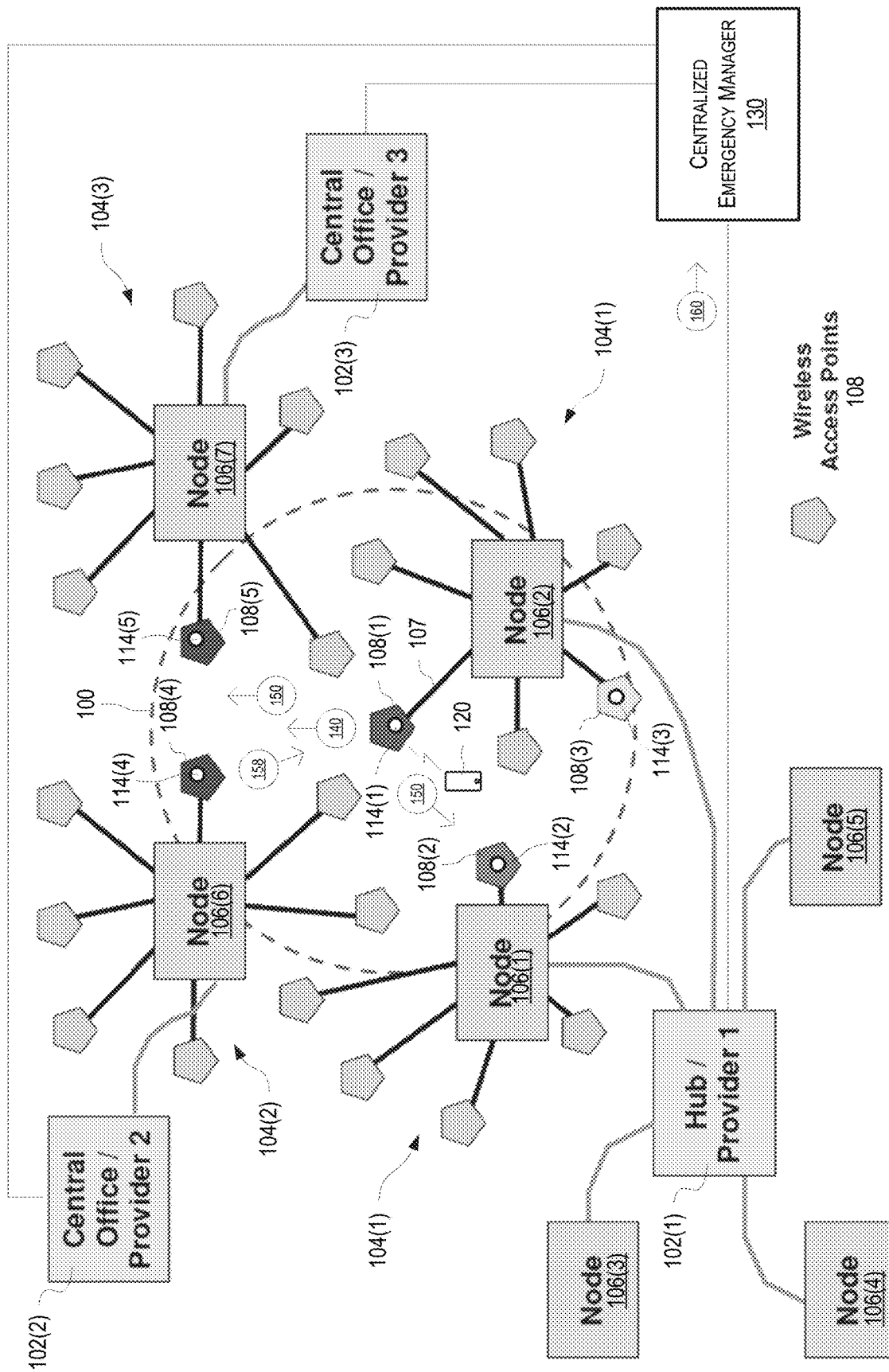
FIG. 1 is a schematic diagram illustrating one example ad-hoc wireless network for emergency communications and health reporting, in embodiments.

FIG. 1 is a schematic diagram illustrating one example ad-hoc wireless network 100 for emergency communications and health reporting. Three network providers 102(1), 102(2), and 102(3) each provide (e.g., operate) a conventional network 104(1), 104(2), and 104(3), respectively. Network provider 102(1) uses five nodes 106(1)-(5); network provider 102(2) uses one node 106(6); and network provider 102(3) uses one node 106(7). Each node 106 is for example a fiber tap and may connect, using a wired (copper) coaxial cable 107 or other such medium, to one or more wireless access points 108, positioned to provide wireless connectivity at a location (e.g., commercial area, office, residence, etc.). The wireless access point 108 (which may also be referred to as an AP) may include, or cooperate with, a cable modem (not shown) that interfaces with cable 107. Each conventional network 104 may connect, via network provider 102, to other networks, such as the internet for example.

In normal operation of conventional network 104(1), a client device 120 (e.g., a smartphone, tablet, laptop, etc.) wirelessly connects to wireless access point 108(1) (e.g., using a Wi-Fi protocol), and thereby connects to the internet via cable 107, node 106(2), and network provider 102(1). However, when a component (e.g., network provider 102, node 106, wireless access point 108, cable 107 and/or other media—fiber, etc.) of conventional network 104(1) fails, at least in part, or loses power, client device 120 may lose contact with the internet for example. Usually, such failures often cannot be reported or diagnosed because of the failure of conventional network 104.

Figure 7:
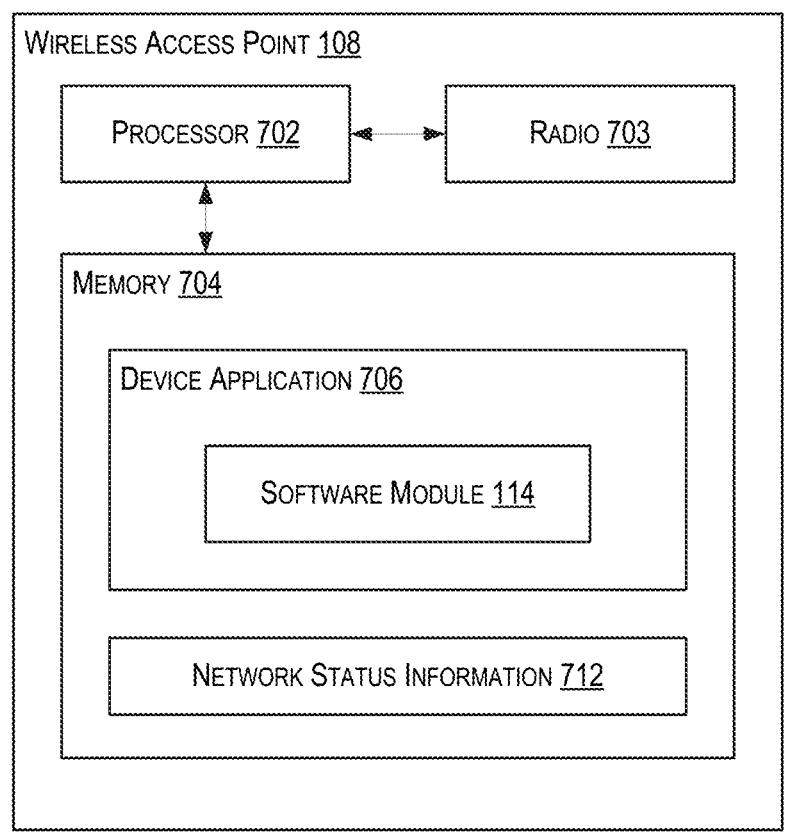
FIG. 7 is a block diagram illustrating one example wireless access point of FIG. 1, in embodiments.

FIG. 7 is a block diagram illustrating one example wireless access point 108. Wireless access point 108 may include a processor 702, at least one radio 703, and memory 704 storing a device application 706 that includes machine readable instructions executable by processor 702 to implement functionality of wireless access point 108 in the embodiments described herein. Advantageously, wireless access point 108 may be improved to include a software module 114 (illustratively shown within device application 706, but may be external thereto) that controls the wireless access points 108 to form ad-hoc wireless network 100 with other wireless access points 108 to provide emergency communication and network status information 712. Network status information 712 may include one or more of: health and performance metrics, spectrum occupancy (allowing better planning for channel allocation and interference management), location coordinates (facilitated through GPS or other means), transmit power, modulations and bands supported, and number of clients and clients' characteristics. Software module 114 may include machine readable instructions executable by processor 702 to enhance functionality of device application 706. Software module 114 may represent a modification of, or an addition to, wireless access point 108 that enhances functionality of wireless access point 108 to implement ad-hoc wireless network 100 of embodiments described herein.

To form ad-hoc wireless network 100, software module 114 controls (see process 500 of FIG. 5.) wireless access point 108 to wirelessly communicate with other neighboring wireless access points 108, leveraging existing transmit and receive resources of the wireless access point, such that ad-hoc wireless network 100 operates contemporaneously with conventional networks 104. Further, software module 114 may control radio 703 of wireless access point 108 to increase (as compared to transmission range when operating for conventional network 104) transmission range and thereby connect to a greater number of other wireless access points 108. Each wireless access point 108 that participates (e.g., that is configured with software module 114) in ad-hoc wireless network 100, maintains, and provides, network status information 712 of wirelessly detectable conventional networks 104, and of client devices (e.g., client device 120) that are served by participating wireless access points 108. In certain embodiments, one or more participating wireless access points 108 may collect information (e.g., frequencies and channels used, power levels received, and activity levels) of nonparticipating wireless access points 108. Although this information is limited, it may indicate a level of resources that may be used for emergency or alternate path transmissions. By distributing network status information 712 between members (e.g., wireless access points 108) of ad-hoc wireless network 100, when an emergency event (e.g., component failure of a conventional network 104, power outage, etc.) occurs, unaffected wireless access points 108 of ad-hoc wireless network 100 may report the failure and provide network status information 712, associated with the failed component, to a centralized emergency manager 130.

Centralized emergency manager 130 may be a cloud based server that receives network status information 712 from ad-hoc wireless network 100, via one or more network providers 102, when a problem with one or more conventional networks 104 occurs. In certain embodiments, central emergency manager 130 may be distributed between network providers 102, where each network provider 102 maintains an emergency management server to receive network status information 712 corresponding to components of their conventional network 104. When centralized emergency manager 130 is distributed between multiple servers, these servers may communicate with each other, via conventional networks (e.g., the internet) to distribute network status information 712 to the appropriate network provider 102. Further, the network status information 712 may be handled securely such that only information of their own conventional network 104 (and components thereof) may be viewed by the respective network provider 102.

Emergency and Failure Assessment Protocol

An emergency and failure assessment protocol used by ad-hoc wireless network 100 may be universal rather than network provider specific, since all wireless access points 108 may benefit from using it and may help other wireless access points 108 that encounter an emergency event. Different network providers 102 may share/exchange outage information (e.g., network status information 712) to aid in troubleshooting network failures and to improve network operation. Ad-hoc wireless network 100 is not limited to a specific frequency and/or limited to a specific band; rather, software module 114 may detect and use any available band.

Wireless access points 108 used for Wi-Fi networks are prolific, being used in many homes, offices, consumer areas, and public spaces. This density of Wi-Fi based wireless access points 108 may be unrealized by other medium range wireless networks, making Wi-Fi implementations suitable for improvement by ad-hoc wireless network 100. Ad-hoc wireless network 100 takes advantage of this density to provide failure assessment and emergency communications by communicating wirelessly between wireless access points 108 within range of each other. Accordingly, the following examples describe use of ad-hoc wireless network 100 to support the Wi-Fi (IEEE 802.11) protocol; however, ad-hoc wireless network 100 may be implemented to support other protocols without departing from the scope of the embodiments described herein. For example, ad-hoc wireless network may be used with protocols such as LTE, LoRa, IEEE 802.16, Bluetooth, ZigBee, Zwave. Although these other protocols may not be implemented in as many network nodes and wireless access points as with Wi-Fi, some of these protocols may have an original wider bandwidth that may provide significant performance advantages for implementing emergency channels by dedicating all their transmission power to a fraction of their subcarriers for emergency purposes. Ones of these protocols that have a limited bandwidth may not provide as much advantage for use with ad-hoc wireless network 100 because the ratio between original channel and emergency channel bandwidth may not be as significant. Accordingly, although ad-hoc wireless network 100 may be implemented with any protocol, some protocols may have greater coverage advantage compared to others.

The 2.4 GHz Wi-Fi band is divided into 14 channels (11 usable channels in USA), each having a bandwidth of 20 MHz. For normal Wi-Fi operation, wireless access point 108 uses one (e.g., selected by a user to have the least interference from other devices) of the 14 channels. Each channel, whether it's IEEE 802.11a/g/n/ac, has 64 subcarriers spaced 312.5 KHz apart. IEEE 802.11a/g use 48 subcarriers for data, 4 for pilot, and 12 as null subcarriers. IEEE 802.11n/ac use 52 subcarriers for data, 4 for pilot, and 8 as null.

Where wireless access point 108 has one radio that operates in a spread spectrum mode (e.g., orthogonal frequency division multiplexing (OFDM)), the radio transmits all used subcarriers for the selected channel simultaneously and the transmission power is divided across all used subcarriers. This power defines the range of wireless access point 108 for Wi-Fi operation. Software module 114 may control radio 703 of wireless access point 108 to use low modulation order and to concentrate transmitter power into a smaller (as compared to conventional operation of the access point) group of subcarriers (e.g., see emergency subcarrier group 204 of FIG. 2) to increase power spectral density and thereby increase communication range of wireless access point 108 to reach other access points that are further away (as compared to conventional operational range of the wireless access point). For example, ad-hoc wireless network 100 may transmit using only a few (e.g., a group of three) of the available subcarriers, and therefore the transmission power is distributed across a smaller portion of the spectrum, resulting in a greater range, albeit at a reduced data rate. In certain embodiments, these groups of subcarriers are selected by each wireless access point 108 to avoid or limit collisions. The transmit power spectral density is maximized because all power from wireless access point 108, which is capable of transmission over a wider bandwidth under normal operation, is dedicated for transmission on fewer subcarriers during transmission for ad-hoc wireless network 100. When wireless access point 108 determines that an emergency subcarrier group is unoccupied, the wireless access point may transmit its ID and characteristics on the unoccupied band, in a network join request message, to temporarily claim the emergency subcarrier group (group of subcarriers) within the channel.

Figure 2:
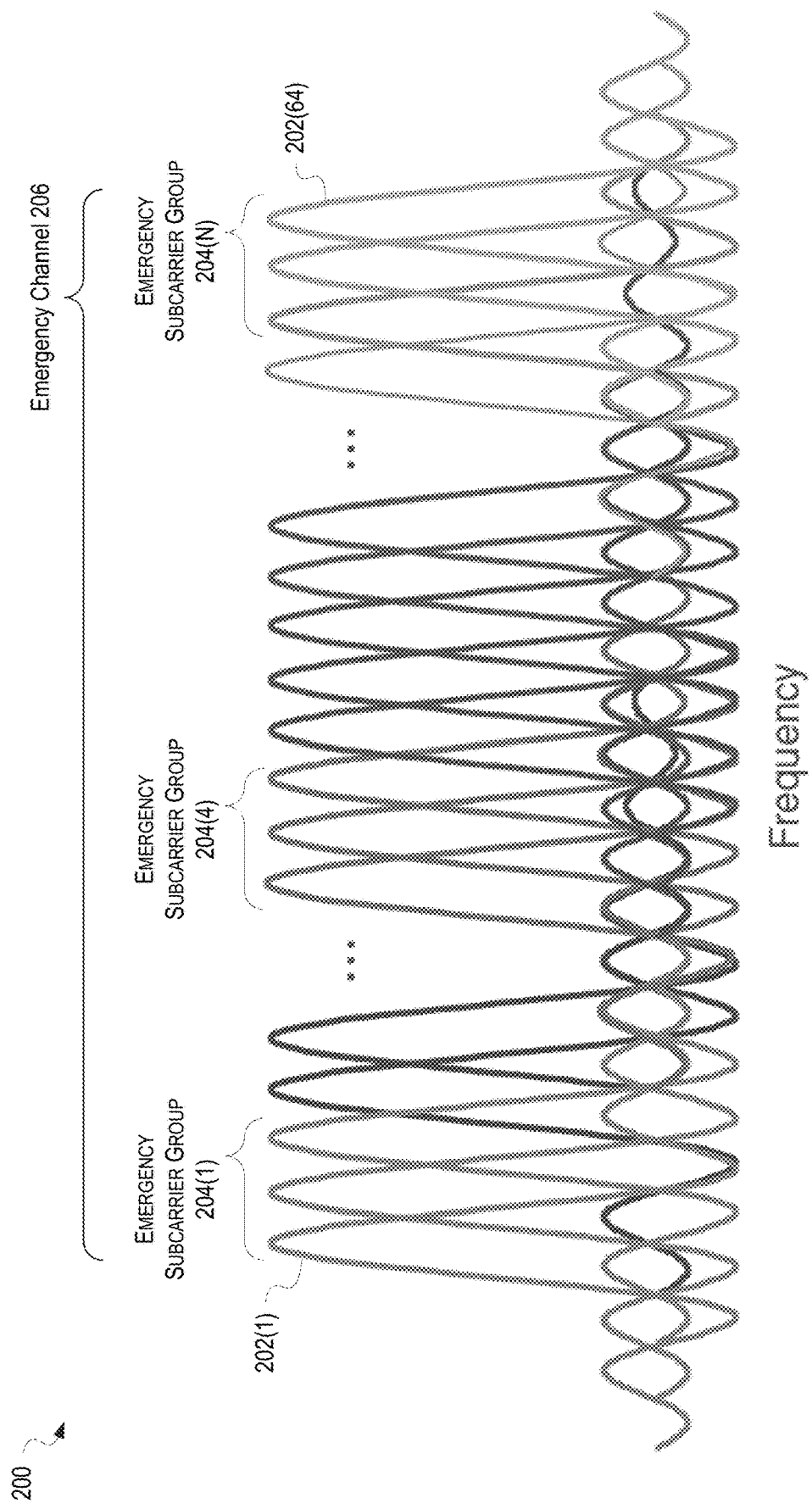
FIG. 2 is a graph showing example allocation of groups of subcarriers as emergency subcarrier groups within an emergency channel used by the ad-hoc wireless network of FIG. 1, in embodiments.

FIG. 2 is a graph 200 showing example allocation of groups of subcarriers 202 as emergency subcarrier groups 204 within an emergency channel 206 (e.g., one Wi-Fi channel) for use by ad-hoc wireless network 100. Wireless access points 108 participating in ad-hoc wireless network 100 thus use the same emergency channel 206, however, wireless access point 108 may participate in more than one ad-hoc wireless network 100, where each ad-hoc wireless network 100 may use a different emergency channel 206.

Emergency channel 206 is divided into a plurality of emergency subcarrier groups 204, each consisting of a group of different adjacent subcarriers 202 of emergency channel 206, as shown in FIG. 2. Wireless access point 108 transmits using one emergency subcarrier group 204, thereby transmitting on a subset of subcarriers of entire emergency channel 206, unlike W-Fi, where the wireless channel is filled by a single transmission. Each wireless access point 108 may select a different emergency subcarrier group 204 and thus multiple wireless access points 108 may transmit simultaneously without collision. For example, when several wireless access points 108 are within wireless range of each other and are affected by the same power outage, each may simultaneously transmit a priority distress message 140 (e.g., an emergency leave message) over the ad-hoc wireless network 100 using their selected emergency subcarrier group 204 without collision, thereby improving reporting of the extent of the network failure and power outage.

When emergency channel 206 is implement using a Wi-Fi wireless channel, emergency channel 206 may also include sixty-four subcarriers. By allocating a group of three subcarriers to each emergency subcarrier group 204, at least sixteen wireless access points 108 may use a single 20 MHz channel without collision. In certain embodiments, where more wireless access points 108 are within wireless range of one another than may operate within a single emergency channel 206 (e.g., a Wi-Fi channel with 64 subcarriers), ad-hoc wireless network 100 may use additional emergency channels 206 for allocating sufficient emergency subcarrier groups 204. In certain embodiments implemented using the Wi-Fi protocol, since emergency channel 206 may use fewer subcarriers than available in the Wi-Fi channel, ad-hoc wireless network 100 may implement multiple emergency channels 206 within one Wi-Fi channel. Wireless access point 108 uses carrier sensing to determine when the Wi-Fi channel, emergency channel 206 and/or emergency subcarrier groups 204 are silent, and thus available for use, to determine transmit opportunities.

Figure 3:
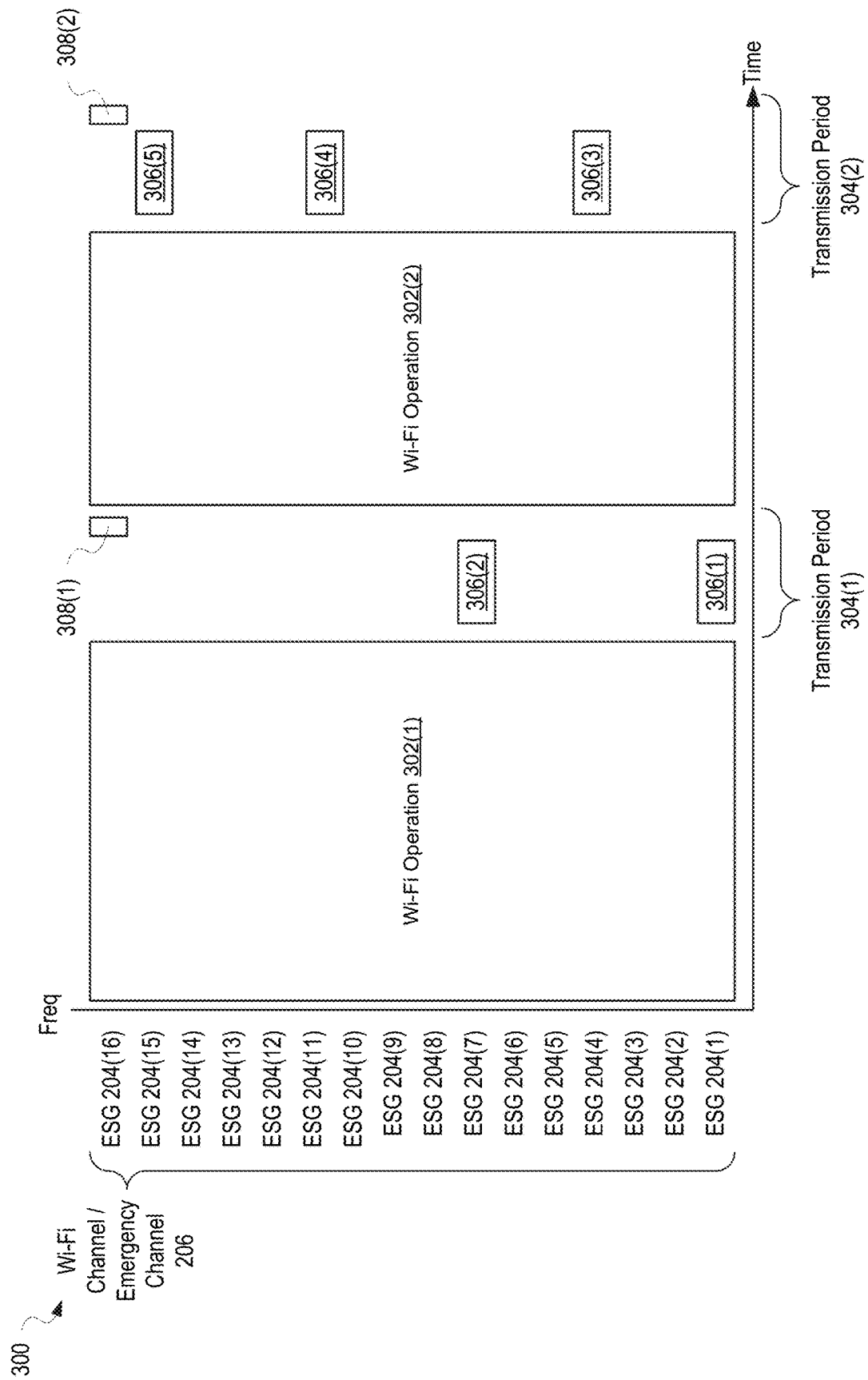
FIG. 3 is a graph illustrating use of one Wi-Fi channel as emergency channel illustrating example time division multiplexing between Wi-Fi use and use by the ad-hoc wireless network of FIG. 1, in embodiments.

FIG. 3 is a graph 300 illustrating use of one Wi-Fi channel as emergency channel 206 illustrating example time division multiplexing between Wi-Fi use and use by ad-hoc wireless network 100. The horizontal axis shows time and the vertical axis shows frequency of emergency channel 206 divided into sixteen emergency subcarrier groups 204. Although shown to overlap with emergency channel 206, each wireless access point 108 may operate its Wi-Fi network of different Wi-Fi channels. and may therefore not, or partially, overlap with emergency channel 206. Wi-Fi operation 302(1) and 302(2) represents use of any Wi-Fi channel (each with sixty-four subcarriers) as defined by the respective Wi-Fi protocol. Particularly, wireless access points 108 that are within wireless range of each another preferably use different Wi-Fi channels to reduce interference. During periods of Wi-Fi operation 302, emergency channel 206 is not used by wireless access points 108 of ad-hoc wireless network 100 (although, Wi-Fi operation 302 may occur at the same frequencies).

Accordingly, Wi-Fi operation 302 and transmission periods 304 of ad-hoc wireless network 100 are time division multiplexed. As shown in the example of FIG. 3, transmission periods 304(1), 304(2), and so on, are interleaved with periods of Wi-Fi operation 302(1), 302(2), and so on. To reduce the impact of ad-hoc wireless network 100 on regular Wi-Fi operation, and particularly when emergency backhaul is provided via ad-hoc wireless network 100 to one or more wireless access points 108, ad-hoc wireless network 100 may limit time resource use no more than a percentage (e.g., twenty percent, ten percent, five percent, etc.). When conveying only network status information (e.g., network status information 712), the impact of ad-hoc wireless network 100 on operation of the conventional protocol (e.g., Wi-Fi) is negligible. Accordingly, communication between wireless access points 108 and their clients (e.g., client device 120) occur during Wi-Fi operations 302, and communication between wireless access points 108 of ad-hoc wireless network 100 occurs during transmission periods 304. In certain embodiment, to prevent disruption of normal protocol (e.g., Wi-Fi) operation, ad-hoc wireless network 100 may wait for longer periods of silence before communicating, thereby giving greater priority to normal protocol operation.

In the example of FIG. 3, during transmission period 304(1), a first wireless access point (e.g., wireless access point 108(2)) generates a transmission 306(1) on emergency subcarrier group 204(1) simultaneously with a second wireless access point (e.g., wireless access point 108(4)) on emergency subcarrier group 204(7). In response, a master wireless access point (e.g., wireless access point 108(1)) may generate a transmission 308(1) (e.g., acknowledgement to one or both of transmissions 306(1) and 306(2), network status update, and/or emergency backhaul data transfer) using its selected emergency subcarrier group 204(16). However, where transmission 306 indicates immanent failure of the corresponding wireless access point 108, acknowledgements may not be required, since the wireless access point may not be alive (e.g., due to lack of power). Accordingly, acknowledgements may only be used for emergency backhaul. During subsequent transmission period 304(2), third, fourth, and fifth wireless access points 108 generate transmissions 306(3), 306(4), 306(5) on emergency subcarrier groups 204(4), 204(11), and 204(15), respectively, and the master wireless access point (e.g., wireless access point 108(1)) may generate transmission 308(2). Since each wireless access point 108 transmits only on its selected emergency subcarrier group 204 (e.g., using a small group of subcarriers of the emergency channel 206), no collision occurs and receiving wireless access points 108 may receive communications from multiple wireless access points simultaneously. In one example of operation, each wireless access point 108 receives the entire channel (e.g., all subcarriers) to decode received data. However, when the wireless access point 108 detects that the received signal occupies only a portion (e.g., a subset of subcarriers) of the channel's spectrum, the wireless access point determines that the transmission is to be processed differently, to separate data received concurrently from different wireless access points over different emergency subcarrier groups 204. As noted above, wireless access point 108 may only transmit when the emergency channel or emergency subcarrier group 204 is available (e.g., no carrier signal detected).

During failure of a conventional network 104, one wireless access point 108 may provide emergency backhaul connectivity to another wireless access point, such as for an emergency call. Ad-hoc wireless network 100 thereby allows information to be exchanged between pairs of wireless access points 108 during each transmission period 304. For example, where cable 107 fails, wireless access point 108(1) may request, over ad-hoc wireless network 100, emergency backhaul connectivity for an emergency call from client device 120. Wireless access point 108(2) may respond, allocating resources of wireless access point 108(2) and node 106(1) for the emergency call and configuring a data path within ad-hoc wireless network 100 to transfer data during transmission periods 304.

Network Provider Cooperation

Coordination among owners of wireless access points 108 and/or network providers 102 may facilitate and/or enhance transport of network status information 712 provided by or through each wireless access point 108. For example, network providers 102 may have agreements to provide emergency backhaul connectivity to each other during network failures, and may agree to transport of network status information 712 to centralized emergency manager 130. At least one wireless access point 108 that is a member of ad-hoc wireless network 100 is configured to pass network status information 712, including one or more of aggregate failure, health, reliability, and emergency channel information, at intervals or as the event occurs, to centralized emergency manager 130 to enable intelligent action to be taken when a failure, emergency, and/or reportable event, occurs. Further, this coordination may include incorporation of software module 114 with each wireless access point 108 to implement ad-hoc wireless network 100.

In the example of FIG. 1, wireless access points 108(1)-(5) are each configured with software module 114 and cooperate to form ad-hoc wireless network 100 in parallel to wireless access points 108 supporting wireless connectivity of client devices (e.g., client device 120) to conventional networks 104. Conventional networks 104 may continue to operate independently, as run by the corresponding network providers 102. That is, each wireless access point 108(1)-(5) participating in ad-hoc wireless network 100 also participates in one conventional network 104 and thus connects (for data backhaul) to a corresponding network provider 102. Each network component (e.g., node 106, network provider 102, etc.) may allocate resources of conventional network 104 for use by connecting client devices (e.g., client device 120). For example, when client device 120 makes a call, wireless access point 108(1), node 106(2), and network provider 102(1) may allocate resources of conventional network 104(1) for the call. Allocation of network resources may similarly occur when emergency backhaul is provided.

Sensing Power Failure and Reporting Before AP is Dead

Failure of components of conventional network 104 may occur due to several reasons, including loss of power at wireless access point 108. However, loss of power may not result in instantaneous failure of the wireless access point 108, since voltage and current within wireless access point

108 may take a few milliseconds to drop below levels required for operation of the access point. Accordingly, wireless access point 108 may detect when it loses power, and may leverage an ultra-low latency protocol implemented by ad-hoc wireless network 100 to send a priority distress message 140 that overrides all other messages to indicate the imminent power failure and loss of connectivity of wireless access point 108. As described above, ad-hoc wireless network 100 may be implemented such that conventional protocol traffic receive priority (e.g., wireless access point 108 determines when the channel is not being used) and thereby reduces impact on the conventional protocol traffic. However, when wireless access point 108 loses power, it transmits immediately on its selected emergency subcarrier group 204, which may impact conventional protocol traffic, but only for this emergency.

Continuing with the example of FIG. 1, where power to wireless access point 108(1) fails, wireless access point 108(1) may transmit priority distress message 140 over ad-hoc wireless network 100, to be received by wireless access point 108(4). Wireless access point 108(4) may notify centralized emergency manager 130, via node 106(6) and network provider 102(2), of the power failure at wireless access point 108(1), and centralized emergency manager 130 may, in turn, notify network provider 102(1) of the failure. In certain embodiments, when centralized emergency manager 130 receives multiple indications of power failure that indicate a power outage over a certain area, centralized emergency manager 130 may also notify a corresponding power company associated with the area of the power outage such that action may be expedited to resolve the issue.

Loss in Network Connectivity

Continuing with the example of FIG. 1, where wireless access point 108(1) detects loss in network connectivity between wireless access point 108(1) and network provider 102(1) (e.g., failure of the default backhaul link for wireless access point 108(1)), wireless access point 108(1) may communicate, using ad-hoc wireless network 100, with a neighboring wireless access point 108(2)-(5) to request an emergency wireless backhaul channel. More than one neighboring wireless access point 108 may answer with availability of the emergency wireless backhaul channel. Neighboring wireless access points 108(2)-(5) may also provide centralized emergency manager 130 (or other controller/processor/database) with outage information, and centralized emergency manager 130 may determine service reliability. Centralized emergency manager 130 may receive multiple emergency reporting messages 160 for the same emergency/failure when multiple wireless access points 108 receive the same priority distress message 140. Centralized emergency manager 130 may coordinate emergency backhaul between multiple providers that have indicated willingness to help in emergencies (e.g., like HAM radio operators in the olden days passing emergency messages after earthquakes or other natural disasters).

Service Brown-Out versus Service Black-Out

Power outages, as previously discussed, may be considered as black-out service conditions when associated with interruption of conventional (e.g., non-emergency) network services. Under certain conditions, the conventional network service may not be interrupted (e.g., may not fail completely), but may suffer performance degradation resulting in a network performance level that is below a pre-determined threshold. These conditions (referred to as brownout conditions) may also be detected and reported via ad-hoc wireless network 100 to centralized emergency manager 130, which in turn may send alert messages to the corresponding network provider 102 for immediate corrective action when possible. For example, where network provider 102 has a service level agreements (SLAs) with customers, maintaining the quality of service provided by conventional network 104 is important. Accordingly, network providers 102 may define performance threshold(s) corresponding to SLAs for use within centralized emergency manager 130 such that alert messages are triggered from centralized emergency manager 130 when quality of service of conventional network 104 falls below the defined performance threshold(s).

The information obtained by network provider 102 from centralized emergency manager 130 when a performance problem is detected, combined with the topology and resources assigned to different portions of the corresponding conventional network 104, may provide network provider 102 with knowledge of how to reconfigure conventional network 104 to make it more resilient to future similar events.

Continuing with the example of FIG. 1, ad-hoc wireless network 100, shown for wireless access point 108(1), includes wireless access points 108(1) and 108(3) that are attached to the same node (e.g., node 106(2) serving the same area). However, greater robustness is achieved when ad-hoc wireless network 100 also includes wireless access points 108 attached to other nodes (e.g., wireless access point 108(2) attached to node 106(1)), and/or includes wireless access points 108 attached to other networks, such as wireless access points 108(4) and 108(5) of conventional networks 104(2) and 104(3), respectively. A cellular based wireless access point, such as a cell phone operating in "Hot-Spot" or "tethering" mode, may also be included within ad-hoc wireless network 100, thereby further enhancing reliability of ad-hoc wireless network 100 to report network status information 712 of conventional networks 104.

Figure 4:
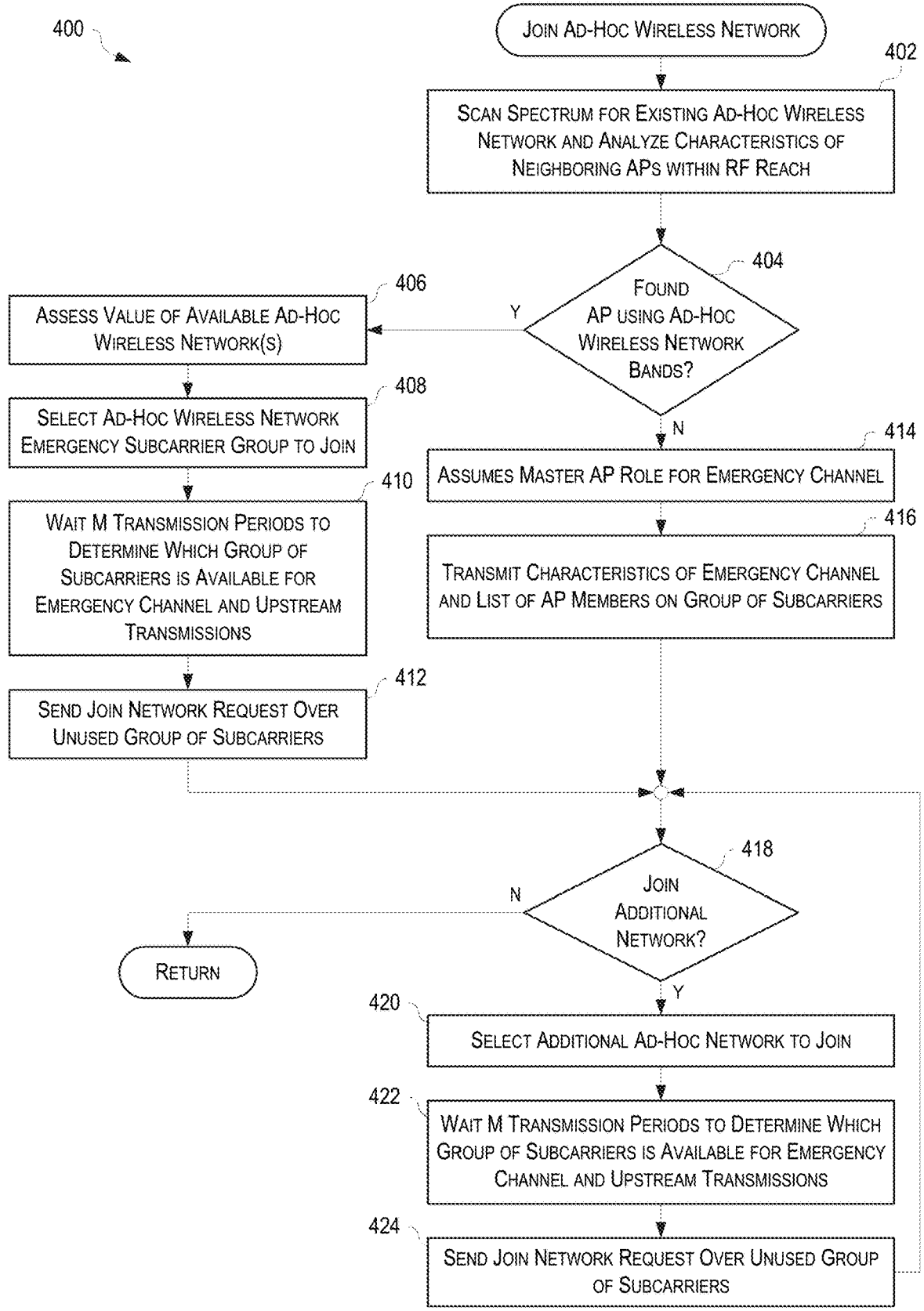
FIG. 4 is a flowchart illustrating one example process for a wireless access point to join the ad-hoc wireless network of FIG. 1, in embodiments.
Figure 5:
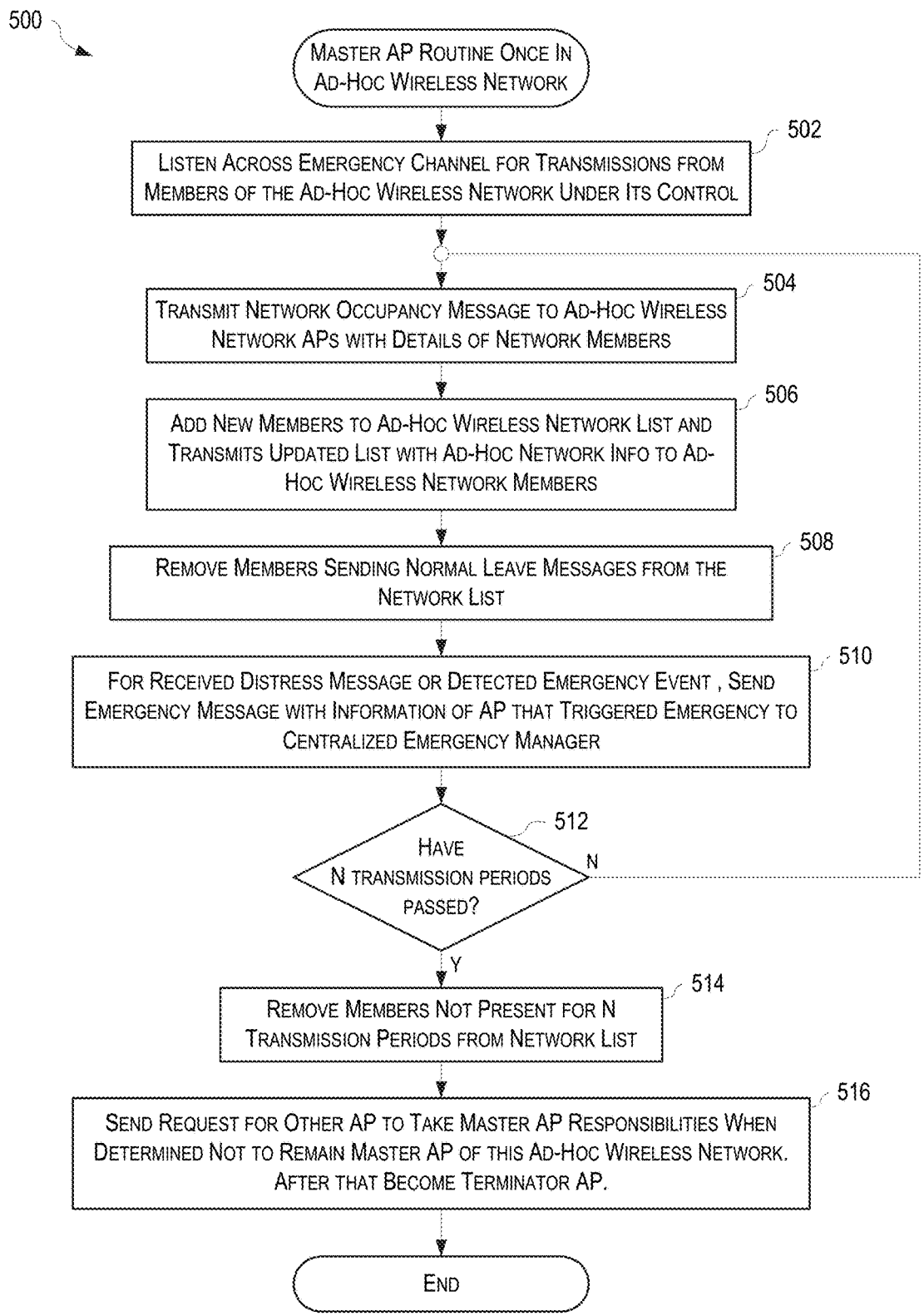
FIG. 5 is a flowchart illustrating one example process for maintaining the ad-hoc wireless network of FIG. 1, in embodiments.
Figure 6:
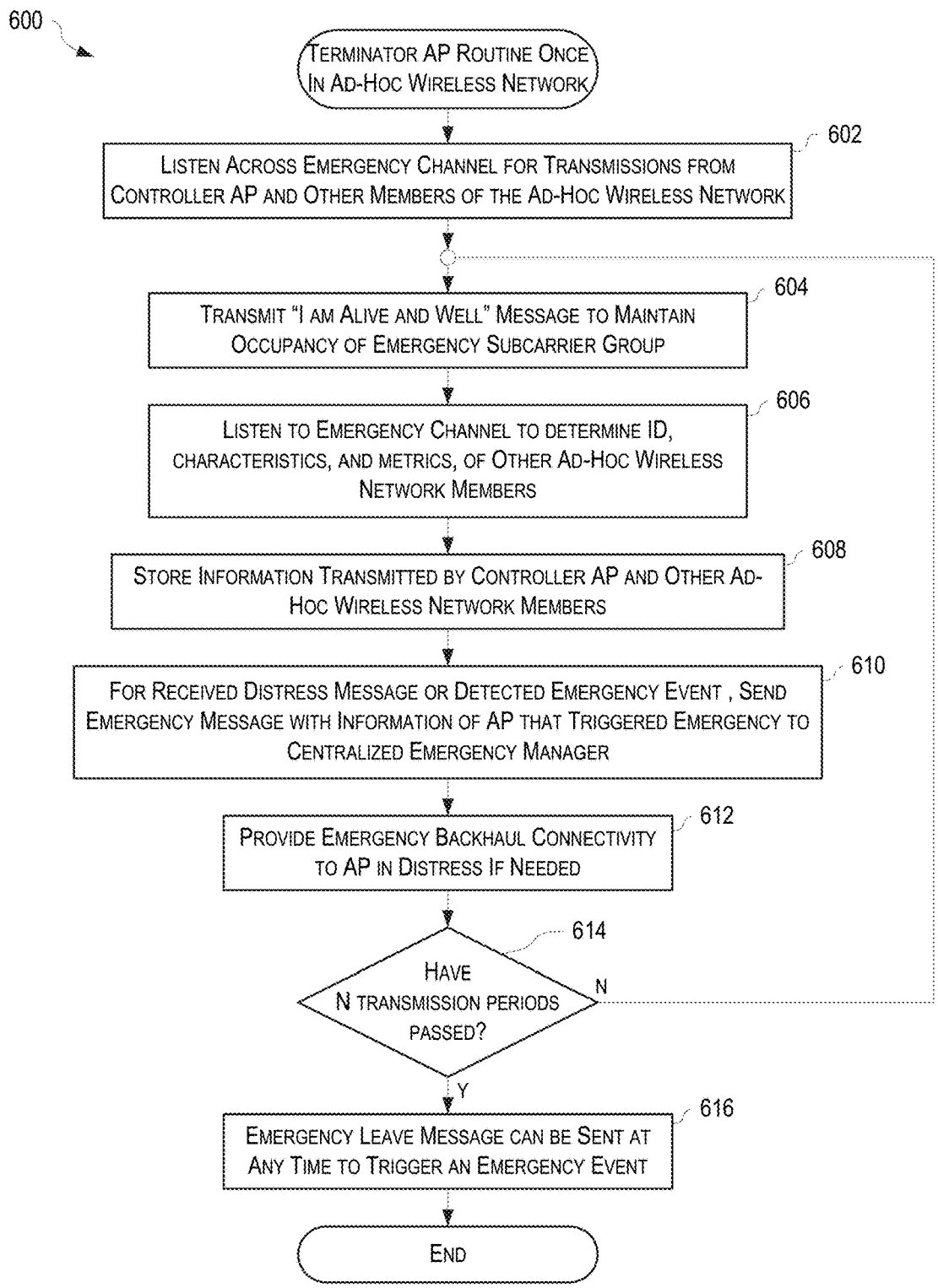
FIG. 6 is a flowchart illustrating one example process for maintaining the ad-hoc wireless network of FIG. 1, in embodiments.

FIGS. 4, 5, and 6 are flowcharts illustrating example processes that enable ad-hoc wireless network 100. In these examples, a wireless access point (e.g., wireless access point 108(1)) operates as master of the ad-hoc wireless network 100, thereby managing its own emergency wireless domain. However, the master wireless access point 108 of each ad-hoc wireless network may be controlled by, and/or coordinate with, centralized emergency manager 130, for example to decide which emergency channel 206 and/or emergency subcarrier groups 204 to use, what population to serve, and so on. Any participating wireless access point 108 may become master of the ad-hoc wireless network 100 and operate to convey information from, and/or provide help to, a neighboring wireless access point.

FIG. 4 is a flowchart illustrating one example process 400 for a wireless access point 108 to join ad-hoc wireless network 100. Process 400 is for example implemented in wireless access points 108. In block 402, process 400 scans the wireless spectrum for an existing ad-hoc wireless network and analyze characteristics of neighboring wireless access points within RF reach. In one example of block 402, software module 114 controls the radio of wireless access point 108(4) to scan for ad-hoc wireless network 100, and to analyze characteristics of neighboring wireless access points 108.

Block 404 is a decision. If, in block 404, process 400 determines that wireless network bands were received and indicate an existing ad-hoc wireless network, process 400 continues with block 406; otherwise, process 400 continues with block 414. In block 406, process 400 assesses value of available ad-hoc wireless network(s). In one example of block 406, wireless access point 108(4) assesses the value (e.g., usefulness to wireless access point 108(4)) of ad-hoc wireless network 100. For example, there may be more than one emergency channel 206 detectable, each corresponding to a different ad-hoc wireless network 100 with its own master wireless access point. Within each emergency channel 206, the corresponding master wireless access point 108 transmits a periodic beacon (e.g., a master message) indicating that it is the master AP and providing additional information indicating how many members (e.g., other wireless access points) belong to that ad-hoc wireless network and thus operate in that emergency channel, what transmit power the master wireless access point is using, and so on. This beacon is transmitted at least once every M transmission periods 304. Therefore, by listening for M transmission periods, the wireless access point 108 should sense the beacon of each master wireless access point (e.g., on each emergency channel) within range. The maximum duration of Wi-Fi transmissions may be used to determine the number of transmissions periods M.

In block 408, process 400 selects an ad-hoc wireless network emergency subcarrier group to join. In one example of block, wireless access point 108(4) selects ad-hoc wireless network 100. In block 410, process 400 waits M transmission periods to determine which group of subcarriers is available to use for emergency channel and upstream transmissions. In one example of block 410, wireless access point 108(4) listens (e.g., receives), during eight consecutive transmission periods 304 of ad-hoc wireless network 100, to detect transmissions 306 from other wireless access points 108 to determine which emergency subcarrier groups 204 of the emergency channel 206 are in use. In block 412, process 400 sends a join network request over unused group of subcarriers. In one example of block 412, wireless access point 108(4) transmits a join network message using emergency subcarrier group 204(4). Process 400 continues with block 418.

In block 414, process 400 assumes master AP role for the emergency subcarrier group. In one example of block 414, wireless access point 108(1) assumes a master role for ad-hoc wireless network 100 and emergency channel 206. In block 416, process 400 transmits characteristics of the emergency channel and a list of AP members on the group of subcarriers. In one example of block 416, wireless access point 108(1) transmits characteristics of newly formed ad-hoc wireless network 100 over a selected one of emergency subcarrier groups 204. Wireless access point 108 may use multiple criteria for selecting which emergency subcarrier group 204 to use. In one example, wireless access point 108 may use proximity, determined by comparing receive signal strength of the beacon and comparing it to the transmit power defined within that beacon (e.g., master wireless access point message). In another example, the wireless access point 108 may monitor the emergency channel 206 to determine how busy it is, selecting a less busy emergency channel to avoid collisions when a disruption simultaneously impacts many devices and further to avoid competition for resources. The master access point (e.g., wireless access point 108(1)) maintains a list of other wireless access points 108 that join the ad-hoc wireless network 100, including which emergency subcarrier group 204 that the wireless access points 108 are using.

Block 418 is a decision. If, in block 418, process 400 determines to join an additional network, process 400 continues with block 420; otherwise, process 400 terminates.

In block 420, process 400 selects an additional ad-hoc network to join. In one example of block 420, wireless access point 108(4) selects another ad-hoc wireless network (other than ad-hoc wireless network 100), and within range of wireless access point 108(4), to join. In block 422, process 400 waits M (see definition of M above) transmission periods to determine which group of subcarriers is available to use for emergency channel and upstream transmissions. In one example of block 422, wireless access point 108(4) listens (e.g., receives), during eight consecutive transmission periods 304 of ad-hoc wireless network 100, to detect transmissions 306 from other wireless access points 108 to determine which emergency subcarrier groups 204 of the emergency channel 206 are in use. In block 424, process 400 sends a join network request over unused group of subcarriers. In one example of block 424, wireless access point 108(4) transmits a join network message using emergency subcarrier group 204(4). Process 400 continues with block 418 to join additional ad-hoc wireless networks.

FIG. 5 is a flowchart illustrating one example process 500 for maintaining ad-hoc wireless network 100. Process 500 is for example implemented within wireless access point 108(1) of FIG. 1 to operate as master AP of ad-hoc wireless network 100.

In block 502, process 500 listens across the emergency channel for transmissions from members of the ad-hoc wireless network under its control. In one example of block 502, software module 114(1) controls wireless access point 108(1) to monitor emergency channel 206 during transmission period 304 to receive transmissions 306 from other wireless access points 108. In block 504, process 500 transmits a network occupancy message to ad-hoc wireless network APs with details of network members. In one example of block 504, software module 114(1) controls wireless access point 108(1) to send a network occupancy message 150, including characteristics of members of ad-hoc wireless network 100 and assigned emergency subcarrier groups 204, to wireless access points 108(2)-(5) using its selected emergency subcarrier group 204(16). In block 506, process 500 adds new members to ad-hoc wireless network list and transmit updated list with ad-hoc wireless network information to ad-hoc wireless network members. In one example of block 506, upon receiving a join network request in transmission 306(2) from wireless access point 108(4), wireless access point 108(1) updates its list of members of ad-hoc wireless network 100 and generates network occupancy message 150.

In block 508, process 500 removes members sending normal leave messages from the network list. In one example of block 508, wireless access point 108(1) removes wireless access point 108(4) from the list of members of ad-hoc wireless network 100 when transmission 306(2) is a normal leave message from wireless access point 108(4). In block 510, process 500, for a received distress message or a detected emergency event, sends an emergency reporting message with information of the AP that triggered the emergency to the centralized emergency manager. In one example of block 510, wireless access point 108(1) sends an emergency reporting message 160 to centralized emergency manager 130 including network status information 712 of wireless access point 108(4) for a distress message 158 received from wireless access point 108(4) indicating failure of node 106(6).

Block 512 is a decision. If, in block 512, process 500 determines that N transmission period have passed, process 500 continues with block 514; otherwise, process 500 continues with block 504. In block 514, process 500 removes members not present for N transmission periods from the network list. In one example of block 514, wireless access point 108(1) removes wireless access point 108(5) from the network list when no transmission 306 has been received from wireless access point 108(4) for sixteen transmission periods 304. Wireless access points 108 that are members (e.g., operating on an emergency channel 206) of ad-hoc wireless network 100, periodically send a transmission (e.g., transmission 306) to the master wireless access point (e.g., wireless access point 108(1)) to indicate that it is still a member. Accordingly, N defines a maximum number of transmission periods 304 between these transmissions. When the master wireless access point has not received a transmission from a particular wireless access point for more than N transmission periods 304 (or for 2N periods to be safe), the master wireless access point assumes that particular wireless access point has left the ad-hoc wireless network, updating the list of members and other information accordingly. In block 516, process 500 sends a request to other AP to take master AP responsibilities when it determines not to remain master AP of this ad-hoc wireless network. After that, it becomes a terminator AP (e.g., a regular non-master wireless access point). In one example of block 516, wireless access point 108(1) sends a request to other wireless access points of ad-hoc wireless network 100 requesting that one of them takes over the role of master wireless access point for the ad-hoc wireless network 100. When another wireless access point 108 responds and assumes the master role, the wireless access point 108(1) transitions to operate as a terminator AP (e.g., as a non-controlling member of ad-hoc wireless network 100). Process 500 then terminates and may be repeated at least periodically or aperiodically. For example, depending on the capabilities/resources of the wireless access point, when resources are available, process 500 may repeat continuously in a loop. When resources are shared with another protocol (e.g., Wi-Fi), then process 500 may be invoked periodically or aperiodically when resources are available.

FIG. 6 is a flowchart illustrating one example process for maintaining ad-hoc wireless network 100. Process 500 is for example implemented within each of wireless access points 108(2)-(5) of FIG. 1 when wireless access point 108(1) operates as master AP of ad-hoc wireless network 100.

In block 602, process 600 listens across the emergency channel for transmissions from controller AP and other members of the ad-hoc wireless network. In one example of block 602, software module 114(1) controls wireless access point 108(4) to monitor emergency channel 206 during transmission period 304 to receive transmission 308 from master wireless access point 108(1) and transmissions 306 from other wireless access points 108. In block 604, process 500 transmits an "I am alive and well" message to maintain occupancy of the allocated emergency subcarrier group. In one example of block 604, software module 114(4) controls wireless access point 108(4) to transmit network occupancy message 150 using emergency subcarrier group 204(7). In block 606, process 600 listens to emergency channel to determine ID, characteristics, and metrics, of other ad-hoc wireless network members. In one example of block 606, software module 114(4) controls wireless access point 108(4) to listen on emergency channel 206 during transmission periods 304 to receive network status information 712, including ID, characteristics, and metrics, of other wireless access points 108 of ad-hoc wireless network 100. In block 608, process 600 stores information transmitted by controller AP and other ad-hoc wireless network members. In one example of block 608, wireless access point 108(4) stores network status information 712 received from wireless access points 108(1), 108(2), 108(3), and 108(5).

In block 610, process 600, for a received distress message or a detected emergency event, sends emergency reporting message with information of the AP that triggered the emergency to the centralized emergency manager. In one example of block 610, wireless access point 108(4) sends emergency reporting message 160 to centralized emergency manager 130 including network status information 712 of wireless access point 108(2) when receiving a distress message 158 from wireless access point 108(2) indicating failure of node 106(1). In block 612, process 600 provides emergency backhaul connectivity to an AP in distress if needed. In one example of block 612, software module 114(2) controls wireless access point 108(2) to provide emergency backhaul connectivity to wireless access point 108(1) when cable 107 fails, allowing wireless access point 108(1) to communicate with network provider 102(1) via wireless access point 108(2) and node 106(1).

Block 614 is a decision. If, in block 614, process 600 determines that N transmission period have passed, process 600 continues with block 616; otherwise, process 600 continues with block 604.

In block 616, process 600 sends an emergency leave message to trigger an emergency event. Process 600 performs block 616 when a network event or imminent power outage is detected within the wireless access point 108. In one example of block 616, wireless access point 108(4) sends an emergency leave message as transmission 306(2) using emergency subcarrier group 204(7). Other wireless access points 108 of ad-hoc wireless network 100 may assume that the emergency leave message indicates imminent failure of wireless access point 108(4), and therefore emergency leave message is handled similarly to a distress message.

Cable Modem Phone Home

Figure 8:
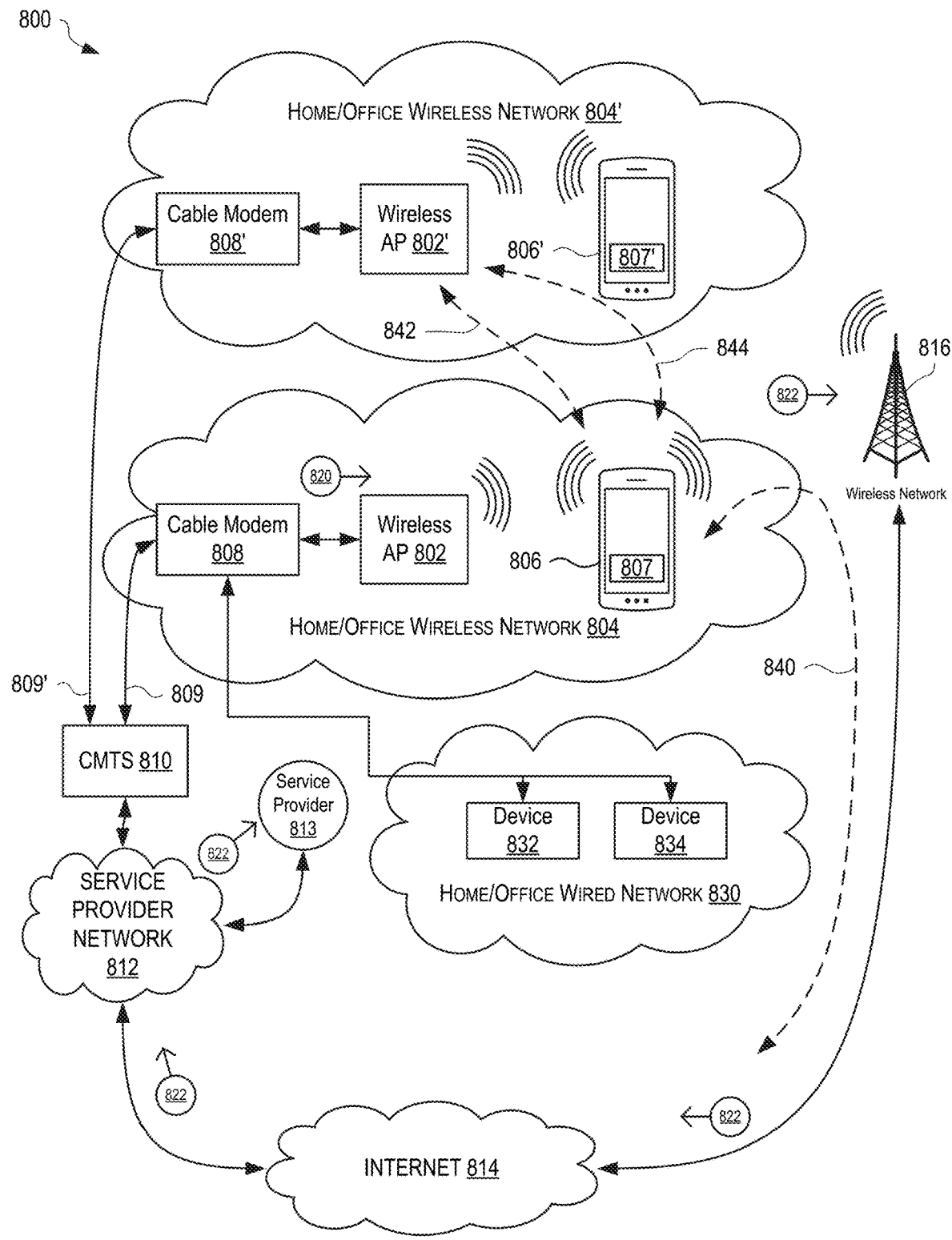
FIG. 8 is a schematic illustrating one example scenario where a wireless access point implements a home/office wireless network that may be accessed by one or more devices, in an embodiment.

FIG. 8 shows one example scenario 800 where a wireless access point 802 implements a home/office wireless network 804 that may be accessed by one or more devices, including a cell phone 806 (e.g., a smartphone), for example. The wireless access point 802 may connect to, or be part of, a cable modem 808, that in turn connects via a wired link 809 to a cable modem termination system (CMTS) 810 of a service provider network 812 operated by a service provider 813. Although cable modem 808 and wired link 809 are used in the following examples, scenario 800 may use other access technologies, such as one or more of digital subscriber line (DSL), gigabit-capable passive optical network (GPON), satellite, and so on, where wired link 809 represents a corresponding alternative media link and cable modem 808 is a corresponding modem device to access that media. The service provider network 812 may connect to the internet 814 such that cell phone 806 may connect to the internet via the wireless access point 802, the cable modem 808, the CMTS 810 and the service provider network 812. Cell phone 806 may also communicate with a wireless network 816 (e.g., a cellular wireless network that may be independent of service provider network 812), which may also connect to the internet 814.

When cable modem 808 is about to fail, or is having communication problems (e.g., when wired link 809 and/or CMTS 810 is failing or has failed), it may be configured to send a message 820 to cell phone 806 via wireless access point 802. For example, cell phone 806 may be in communication range of, and already configured to communicate with, wireless access point 802. Cell phone 806 may include an application 807 that receives message 820 from cable modem 808 and sends a message 822 (e.g., similar to message 820) to service provider 813 to indicate the problem or situation experienced by the cable modem 808, thus making the service provider 813 aware such that action may be taken, possibly before total failure occurs. Advantageously, the communication path provided through the cell phone 806 allows for an additional proactive network maintenance (PNM) opportunity. At a minimum, a last dying gasp message could be sent, indicating the modem is losing power.

Further, the application 807 may also be configured to communicate PNM information (e.g., including event logs) via wireless network 816 to aid troubleshooting problems with cable modem 808 and/or wired link 809, when cable modem 808 has no communication with CMTS 810. For example, before a technician arrives to service cable modem 808 and/or wired link 809, the application 807 may relay useful status, logs, and error reports to service provider 813.

As described above, ad-hoc wireless network 100 may facilitate emergency communication between wireless access points 108 to provide a backup data path for use in an emergency. In the example of FIG. 8, a second home/office wireless network 804' includes a cable modem 808', with a wired link 809' to CMTS 810, that communicates with a wireless access point 802', and a cell phone 806' may be configured to communicate with wireless access point 802' when in range. In this example, home/office wireless network 804' connects to the same CMTS 810 and service provider network 812; however, as described above for the example of FIG. 1, home/office wireless network 804' may connect with a different service provider network without departing from the scope hereof. Accordingly, wireless access point 802 and wireless access point 802' may cooperate to form an ad-hoc wireless network, as described above.

Further, applications 807 and 807' running on cell phones 806 and 806', respectively, may cooperate to provide an additional communication path, via wireless network 816 and/or a different wireless network, to service provider 813 via internet 814. Such additional communication paths may also be used for burst packets when increased bandwidth is temporarily needed.

In certain embodiments, for example to prevent misuse, a bandwidth throttling mechanism may be included; however, when multiple cell phones are within communication range of wireless access point 802, resources available via these cell phones may be pooled to increase available bandwidth as needed and/or distribute load through the multiple cell phones.

Application 807 may be configured for background operation within cell phone 806 such that application 807 automatically logs into home/office wireless network 804 such that it may receive information from cable modem 808 (e.g., in message 820) and relay that information to service provider 813 (e.g., via internet 814). Where cable modem 808 also connects to a home/office wired network 830, certain functionality may also be included with devices 832 and 834 of that network. When cell phone 806 is configured to operate in tethering mode, application 807 may temporarily operate as wireless access point 802 to provide alternative connectivity for other components of home/office wireless network 804 to internet 814. Accordingly, cooperation of application 807 with cable modem 808 allows cell phone 806 to provide emergency backup connectivity of home/office wireless network 804 (and optionally home/office wired network 830 connected to cable modem 808) through tethering of cell phone 806. For example, wireless access point 802 may be configured to connect to the tethered network of cell phone 806 when needed.

Application 807 advantageously receives, in message 820 for example, status and operational information of cable modem 808, and is thereby aware of potential problems before they occur. Accordingly, application 807 may cooperate with cable modem 808 to automatically provide a cellular tethering solution when failure (or potential failure) of communication between cable modem 808 and service provider network 812 occurs. This seamless switching to an alternative data path improves the customer's service and experience. In certain embodiments, where the customer subscribes to a high tier service, the minutes/data usage on the wireless plan used for communication backup may be covered by the service provider as part of an emergency backup service.

In certain embodiments, use of a cellular service for backup may be avoided by using cell phone 806 as a bridge to another participating modem in range that is served by the same provider, but not experiencing the problems of cable modem 808. For example, when communication between cable modem 808 and CMTS 810 fails (e.g., when wired link 809 is cut), cable modem 808 and/or wireless access point 802 may determine that cell phone 806 is in range of wireless access point 802, and then instruct (e.g., by sending a message) application 807 running on cell phone 806 to form an alternative communication path 842 between cable modem 808 and service provide network 812 via wireless access point 802, cell phone 806, wireless access point 802', cable modem 808', wired link 809', and CMTS 810. In another example, application 807 may control cell phone 806 to form a peer-to-peer connection to cell phone 806 and cell phone 806', thereby providing an alternative communication path 844 between cable modem 808 and service provider network 812 via wireless access point 802, cell phone 806, cell phone 806', wireless access point 802', cable modem 808', wired link 809', and CMTS 810. In certain embodiments, when communication between cable modem 808 and CMTS 810 fails, but cell phone 806 is not in communication with cell phone 806', wireless AP 802', or wireless network 816, application 807 may collect and store information (e.g., via message 820) from cable modem 808, and transfer that information to service provider 813 when cell phone 806 establishes network connectivity (e.g., with any one or more of cell phone 806', wireless AP 802', or wireless network 816). Advantageously, information of the failed communication between cable modem 808 and CMTS 810, even when communicatively isolated, may eventually reach service provider 813.

In certain embodiments, provisioning and configuration of cable modem 808 may be enabled through application 807. For example, application 807 (once downloaded onto cell phone 806) may communicate with cable modem 808 (e.g., via wireless access point 802) to collect information on its setup and condition, when cable modem 808 is not communicating with CMTS 810, and may thereby provide detailed troubleshooting information to service provider 813 via wireless network 816 and internet 814.

In certain embodiments, cable modem 808 may be equipped (e.g., with amplifier and speaker) to generate modem-like audio tones that encode useful information that may be communicated over a phone call to service provider 813 to allow remote troubleshooting without requiring application 807 to run on cell phone 806. In other embodiments, cable modem 808 may interact with wireless access point 802 to configure a communication path between cable modem 808 and service provider network 812 via cell phone

806. Advantageously, this communication would increase customer satisfaction and reduce troubleshooting and provisioning operations costs by allowing service provider 813 to communicate directly with cable modem 808.

Further, similar mechanisms may be provided to provision and troubleshoot other home network devices. For example, application 807 may be selected and downloaded to provision and/or troubleshoot a particular device connected management-wise to home/office wireless network 804 and/or home/office wired network 830 via a communication path provided via cell phone 806 and wireless network 816.

Certain software-defined networking in a wide area network (SD-WAN) devices use broadband (e.g., cable modem 808) as a first network access method, but are configured with a cellular modem to provide a second network access method (e.g., cellular). However, this SD-WAN configuration may be unnecessary for cable modem 808 and/or wireless access point 802 where many cell phones (e.g., cell phone 806) with tether capability are within range of wireless access point 802. When cable modem 808 detects communication problems through wired link 809, cable modem 808 may co-operate with wireless access point 802 to detect one or more cell phones 806 within wireless range of wireless access point 802.

Application 807, running on cell phone 806, may be authorized by the owner to operate in tether mode when requested by cable modem 808 and/or wireless access point 802. For example, through wireless access point 802, cable modem 808 may determine that at least one cell phone 806 is in the area of wireless access point 802, based upon connectivity of the at least one cell phone 806 to wireless access point 802 for example, and instruct the at least one cell phone 806 to operate in tether mode to provide an alternative communication path 840 (e.g., an alternative to communication paths through CMTS 810) between cable modem 808 and/or wireless access point 802 and internet 814.

In one example of operation, having application 807 loaded and configured on cell phone 806 indicates the user's permission for cell phone 806 to operate in tether mode when requested. In certain embodiments, application 807 may be configured to control bandwidth usage by cable modem 808 and/or wireless access point 802 over alternative communication path 840, and in certain embodiments may allow use of all available bandwidth. Where multiple cell phones 806 are configurable to operate in tether mode, the bandwidth needed by cable modem 808 and/or wireless access point 802 may be shared between these cell phones 806, and where these cell phones 806 connect to different wireless networks 816, the load is shared and thereby has lower impact to users of these cell phones 806.

In certain embodiments, when cable modem 808 is unable to communicate with service provider network 812 (e.g., when wired link 809 is cut, CMTS 810 not operating, and/or when cable modem 808 is not configured to communicate with CMTS 810), application 807 may communicate, via cell phone 806 and wireless access point 802, with cable modem 808 to collect information on its setup and condition and provide detailed troubleshooting information to service provider 813.

Figure 9:
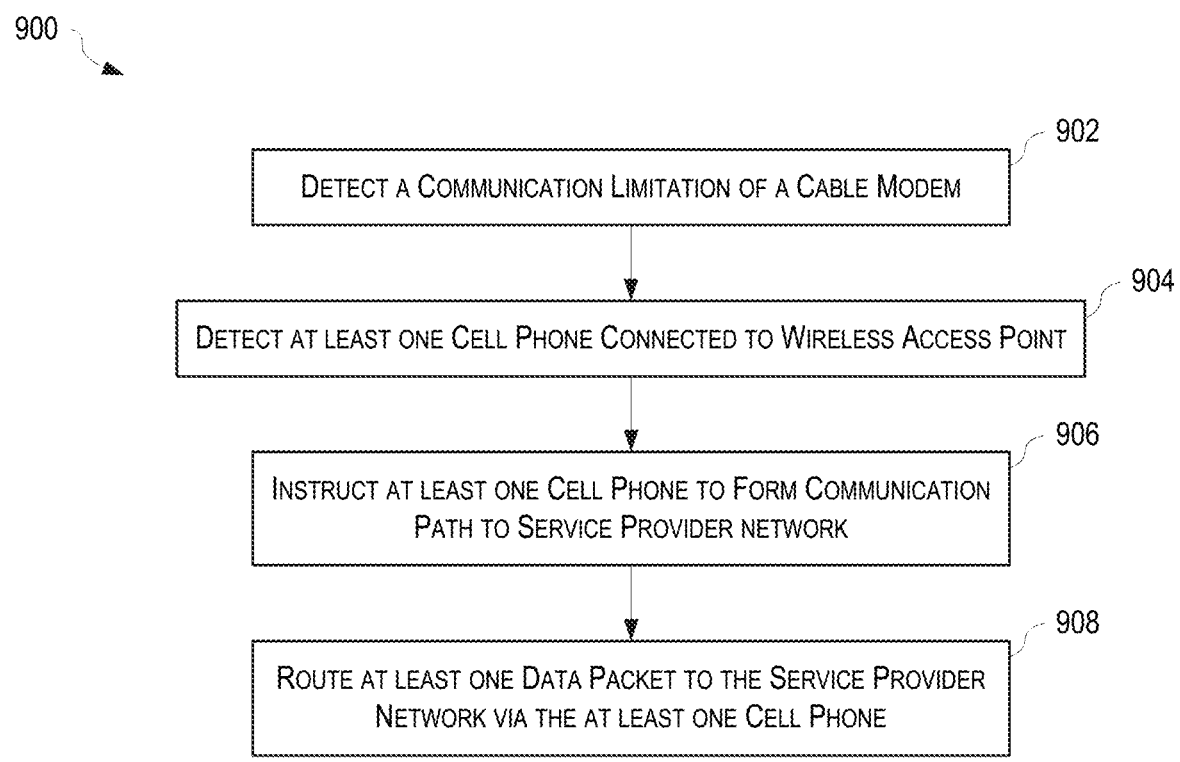
FIG. 9 is a flowchart illustrating one example method for using a cell phone to provide an alternative communication path between a cable modem and a service provider network, in an embodiment.

FIG. 9 is a flowchart illustrating one example method 900 for using a cell phone to provide an alternative communication path between a cable modem and a service provider network, in an embodiment. Method 900 may be implemented in one or both of wireless access point 802 and cable modem 808, for example.

In block 902, method 900 detects a communication limitation of a cable modem. In one example of block 902, wireless access point 802 detects a problem with one or both of cable modem 808 and/or wired link 809 that prevents or limits communication between cable modem 808 and service provider network 812. In block 904, method 900 detects at least one cell phone connected to the wireless access point. In one example of block 904, wireless access point 802 determines that it connects to cell phone 806 (e.g., cell phone 806 has an open connection with wireless access point 802). In block 906, method 900 instructs the at least one cell phone to form an alternative communication path to the service provider network. In one example of block 906, cable modem 808 sends a message to cell phone 806 via wireless access point 802 instructing cell phone 806 to form an alternative communication path between the cable modem 808 and the service provider network 812. In block 908, method 900 routes at least one data packet to the service provider network via the at least one cell phone. In one example of block 908, cable modem 808 routes at least one data packet to service provider network 812 via cell phone 806.

Figure 10:
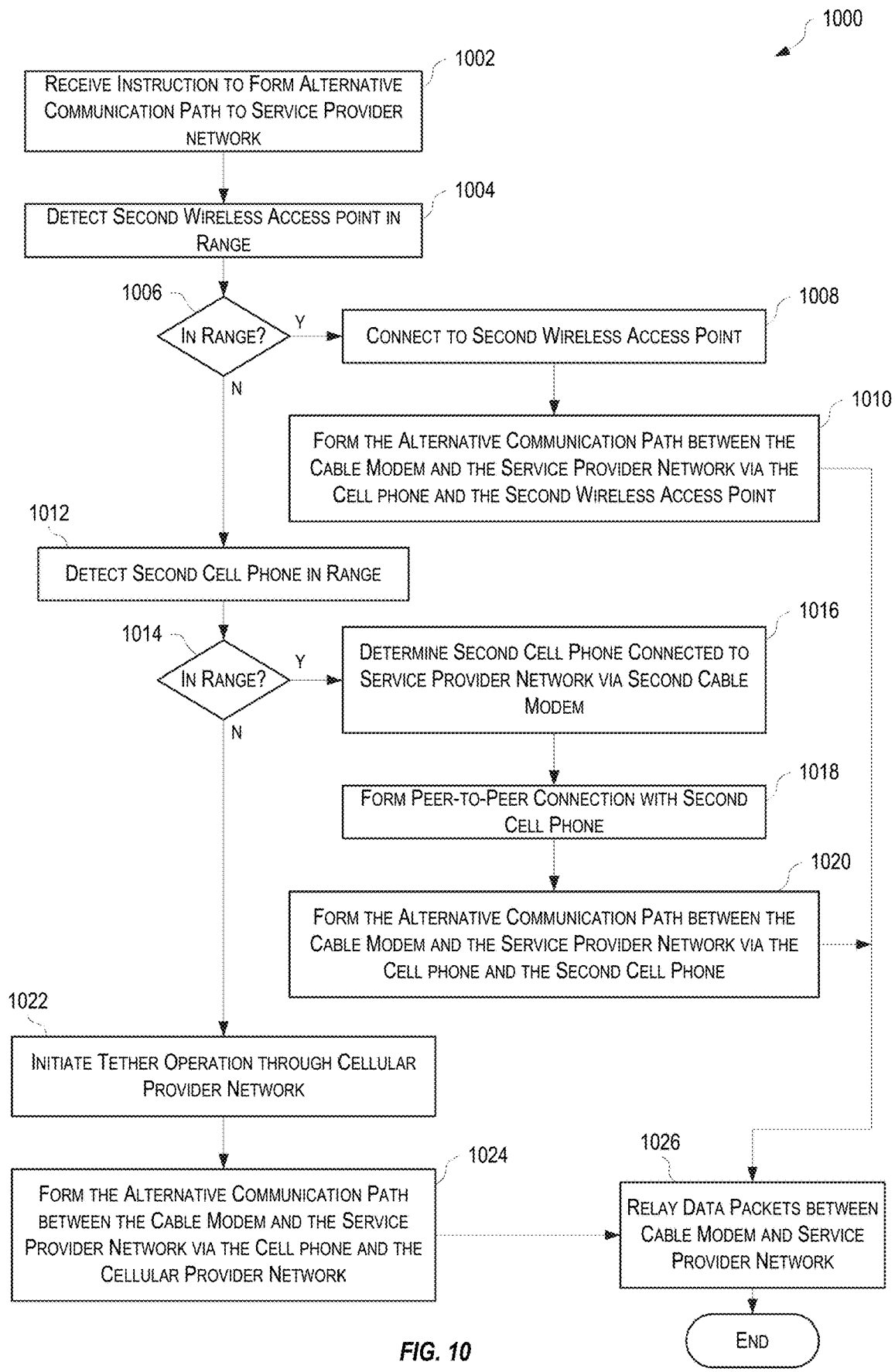
FIG. 10 is a flowchart illustrating one example method for a cell phone to provide an alternative communication path between a cable modem and a service provider network, in an embodiment.

FIG. 10 is a flowchart illustrating one example method 1000 for a cell phone to provide an alternative communication path between a cable modem and a service provider network. Method 100 may be implemented at least in part in application 807 running on cell phone 806, for example. For example, method 900 and method 1000 may cooperate to form one of alternative communication paths 840, 842, and 844 between cable modem 808 and service provider network 812.

In block 1002, method 1000 receives instruction to form alternative communication path to service provider network. In one example of block 1002, application 807 receives a message from cable modem 808, via wireless access point 802, instructing cell phone 806 to form an alternative communication path between cable modem 808 and service provider network 812. In block 1004, method 1000 detects second wireless access point in range of the cell phone. In one example of block 1004, application 807 controls cell phone 806 to detect wireless access point 802'.

Block 1006 is a decision. If, in block 1006, method 1000 determines that a second wireless access point is in range of the cell phone, method 1000 continues with block 1008; otherwise, method 100 continues with block 1012.

In block 1008, method 1000 connects to the second wireless access point. In one example of block 1008, application 807 controls cell phone 806 to wirelessly connect to wireless access point 802'. In block 1010, method 1000 forms the alternative communication path between the cable modem and the service provider network via the cell phone and the second wireless access point. In one example of block 1010, application 807 forms alternative communication path 842 between cable modem 808 and service provider network 812 via cell phone 806 and wireless access point 802'. Method 1000 then continues with block 1026.

In block 1012, method 1000 detects a second cell phone in range. In one example of block 1012, application 807 controls cell phone 806 to detect second cell phone 806' using short range wireless protocol. Block 1014 is a decision. If, in block 1014, method 1000 determines that a second cell phone is in range, method 1000 continues with block 1016; otherwise, method 1000 continues with block 1022.

In block 1016, method 1000 determines that the second cell phone is connected to the service provider network via a second cable modem. In one example of block 1016, application 807 communicates with application 807' running on cell phone 806' to determine that cell phone 806' is connected to service provider network 812 via cable modem 808'. In block 1018, method 1000 forms a peer-to-peer connection with the second cell phone. In one example of block 1018, application 807 and application 807' cooperate form a peer-to-peer connection between cell phone 806 and cell phone 806'. In block 1020, method 1000 forms the alternative communication path between the cable modem and the service provider network via the cell phone and the second cell phone. In one example of block 1020, application 807 cooperates with application 807' to form communication path 844 between cable modem 808 and service provider network 812 via wireless access point 802, cell phone 806, cell phone 806', wireless access point 802', and cable model 808'. Method 1000 then continues with block 1026.

In block 1022, method 1000 initiates a tether operation through cellular provider network. In one example of block 1022, application 807 initiates tether operation of cell phone 806 through wireless network 816. In block 1024, method 1000 forms the alternative communication path between the cable modem and the service provider network via the cell phone and the cellular provider network. In one example of block 1024, application 807 forms alternative communication path 840 between cable modem 808 and service provider network 812 via cell phone 806 and wireless network 816.

In block 1026, method 1000 relays data packets between the cable modem and the service provider network via the alternative communication path. In one example of block 1026, application 807 relays data packets between cable modem 808 and service provider network 812 via one of alternative communication paths 840, 842, and 844.

When the fault is repaired or corrected (e.g., when wired link 809 is repaired), data packets may be routed over the repaired connection. In certain embodiments, cable modem 808 may determine when the wired link 809 is operational and resume data packet routing via wired link 809. In other embodiments, service provider 813 may determine when wired link 809 is operational, and instruct cable model 808 to resume data packet routing via wired link 809. This may prevent thrashing (e.g., repeated enabling and disabling routing of data packets over wired link 809) when repairs are intermittent.

Bandwidth Burst

Any given broadband solution has limited capacity, either in the Wi-Fi bandwidth, or the upstream connection from the modem to the service provider network. While pair bonding and multithreading may be used to combine capacity in some limited applications, these solutions either require additional permanent capacity on new physical network connections, or still suffer from the limits of the physical network connections.

Wi-Fi modems may be configured to communicate peer-to-peer through the physical broadband (DSL, DOCSIS) or Wi-Fi layers. In certain embodiments, secure peer-to-peer connections may be set up to allow a second upstream data path. For example, when a user needs bandwidth beyond that allocated through conventional connection (e.g., the user wishes to "burst" their data communication capacity temporarily), a first modem, requiring the additional capacity, may signal a neighboring second modem (e.g., using a broadcast or through a mesh network) to receive burst packets via a peer-to-peer connection for upload to the service provider network, and/or internet, via the second modem. The first modem may send most packets through its wired link to the network, and send overflow packets (e.g., packets that exceed the bandwidth of the wired link) to the second modem for upload to the network via a second wired link of the second modem. Similarly, where a downstream bandwidth limit of the first modem is reached, packets may be sent over the second wired link to the second modem and sent peer-to-peer from the second modem to the first modem. For example, the ad-hoc wireless network 100 of FIG. 1 may be used to configure peer-to-peer communication and/or used to transport overflow packets between nearby wireless access points 108.

In the embodiments described above, additional, and/or alternative communication paths (e.g., alternative communication paths 840, 842, and 844) may be formed between a wireless modem (e.g., wireless access points 108, cable modem 808 and wireless access point 802) and a service provider network when a communication path (e.g., wired link 809) is impaired or fails. However, such connections may also be used when a connected device (e.g., client device 120, call phone 806, devices 832, 834) has a temporary need of increased bandwidth or when additional reliability of data delivery is required.

Figure 11:
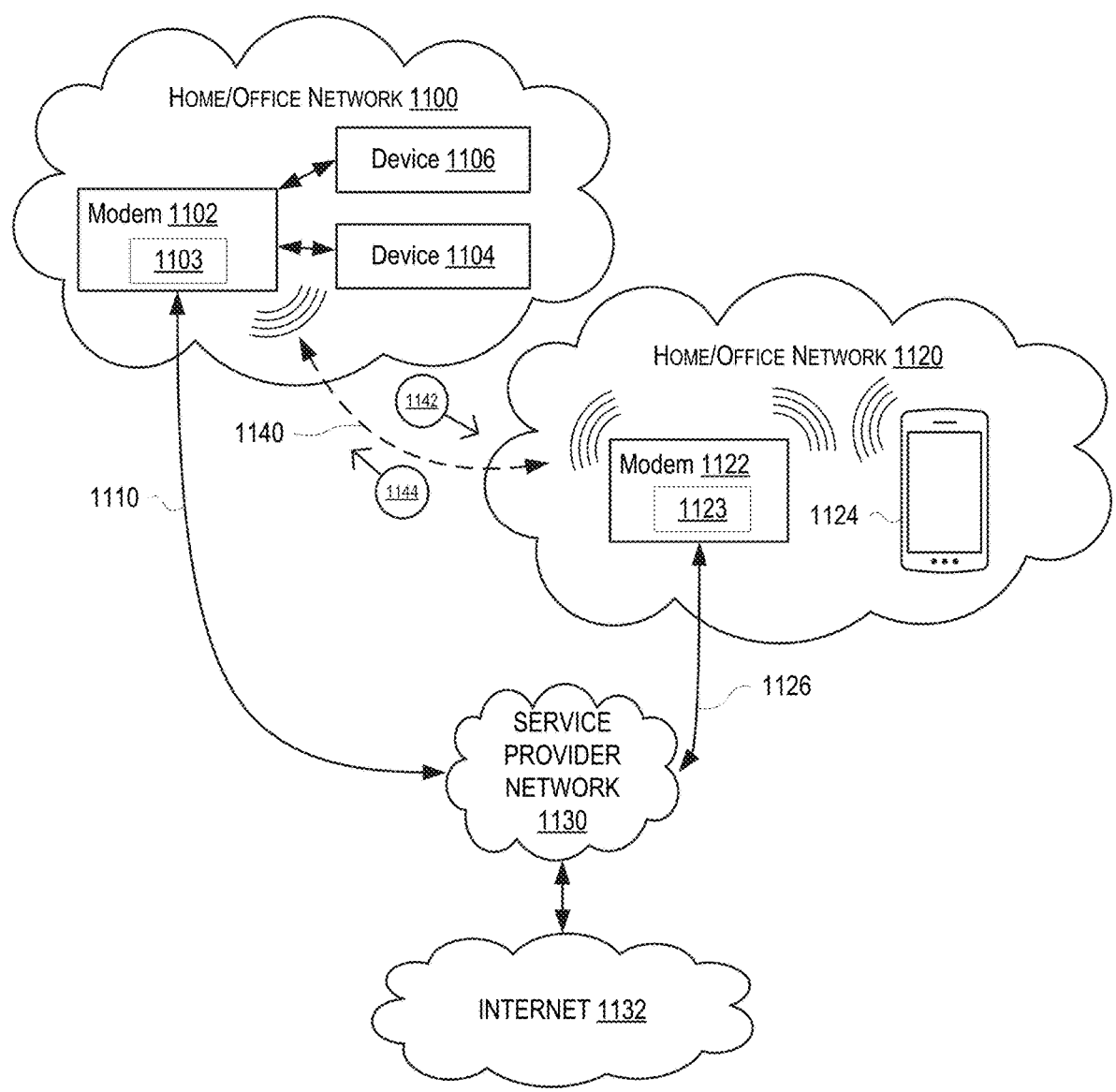
FIG. 11 shows one example network scenario where a first home/office network and a second home/office network are connected to the internet via a service provider network, in an embodiment.

FIG. 11 shows one example network scenario where a first home/office network 1100 and a second home/office network 1120 are connected to the internet 1132 via a service provider network 1130. First home/office network 1100 includes a first device 1104 and a second device 1106 that communicate with service provider network 1130 via a modem 1102 and a link 1110 (e.g., one or more of a wired link, a WiMAX link, a fixed 5G link, and an optical cable link). Modem 1102 may include a first modem application 1103 that controls operation of modem 1102 to provide one or both of wired and wireless connectivity within first home/office network 1100. Second home/office network 1120 includes a cell phone 1124 that communicate with service provider network 1130 via a second modem 1122 and a second link 1126 (e.g., one or more of a wired link, a WiMAX link, a fixed 5G link, and an optical cable link). Second modem 1122 may include a modem application 1123 that controls operation of modem 1122 to provide one or both of wired and wireless connectivity within second home/office network 1120. In this example, each link 1110, 1126, has a downlink bandwidth of 6 Mb/s and an uplink bandwidth of 2 Mb/s, controlled by service provider network 1130 (e.g., based upon a service contract). Further, modem 1102 and modem 1122 are within wireless range of each other.

In one scenario, device 1104 is uploading a large first file to internet 1132 via service provider network 1130, and is using all available upload bandwidth (e.g., 2 Mb/s). While upload of the first file is in progress, device 1106 needs to quickly upload a second file to service provider network 1130. Application 1103 may determine that upload bandwidth availability of link 1110 is insufficient for requirements of device 1106, because of the first large file is being uploaded, and therefore application 1103 broadcasts a message 1142 requesting temporary upload bandwidth. In response to receiving message 1142, modem application 1123 determines that there is unused uplink bandwidth on link 1126, and modem application 1123 sends a message 1144 to modem 1102 indicating the available upload bandwidth. Application 1103 may then form a temporary peer-to-peer connection 1140 between modem 1102 and modem 1122, and may send one or more data packets (e.g., data packets of one or both of the first file and the second file) to modem 1122 via the temporary peer-to-peer connection 1140. Application 1123 receives the data packets via temporary peer-to-peer connection 1140 and sends the data packets to service provider network 1130 via link 1126. Advantageously, application 1103 and application 1123 cooperate to make spare bandwidth of link 1126 available for use by devices of first home/office network 1100 via modem 1102. When the additional bandwidth is no longer needed, first modem applications 1103 and 1123 may disconnect temporary peer-to-peer connection 1140.

Advantageously, by configuring modems 1102 and 1122 to participate in emergency bandwidth sharing, users of first home/office network 1100 and/or second home/office network 1120 may benefit from bursts in bandwidth for short periods of time. In another example, reliable bit delivery is critical in certain service classes, but not for all services at a given broadband edge location. Although shown connecting to the same service provider network 1130, modems 1102 and 1122 may connect to different service provider network without departing from the scope of the embodiments herein.

In certain embodiments, to implement reliable bit delivery, first modem application 1103 and second modem application 1123 may cooperate to form temporary peer-to-peer connection 1140 such that critical packets may be sent via both links 1110 and 1130 for one or both of upstream and downstream delivery.

As noted above, modems 1102 and 1122 may be configured to cooperate (e.g., through agreement between owners of modems 1102 and 1122, which may be facilitated through service provider network 1130. In certain embodiments, as described above, communication may be made via a connected cell phone and via a cellular provider network. By definition, bursts are infrequent. Reliable bit delivery is also not frequent, but occurs. By addressing these needs without expensive capacity augmentation, the service provided to users by modems 1102 and 1122 is improved.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A modem bandwidth burst method, comprising:
   receiving, at a first wireless access point, data packets from one or more connected devices;
   determining, at the first wireless access point, that transmission of the data packets exceeds a bandwidth of a first link between the first wireless access point and a first service provider network;
   broadcasting, from the first wireless access point, a request for temporary bandwidth;
   receiving, from a second device, an indication of available bandwidth;
   in response to the indication of additional bandwidth, establishing an additional communication path, additional to the first link, between the first wireless access point and the second device; and
   sending at least one, but not all, of the data packets via the additional communication path to the second device for delivery to the first service provider network.

2. The modem bandwidth burst method of claim 1, the determining comprising detecting a limitation of one of an uplink bandwidth of the first link and a downlink bandwidth of the first link.

3. The modem bandwidth burst method of claim 1, the second device comprising a second wireless access point having a second link to the first service provider network.

4. The modem bandwidth burst method of claim 3, the additional communication path comprising a temporary connection between the first wireless access point and the second wireless access point.

5. The modem bandwidth burst method of claim 3, the first wireless access point implementing a wired connection with the one or more connected devices and the second wireless access point implementing a wireless connection with at least one connected device.

6. The modem bandwidth burst method of claim 3, the first wireless access point and the second wireless access point each connecting with the first service provider using a different one of a wired link, a WiMAX link, a 5G link, and an optical cable link.

7. The modem bandwidth burst method of claim 1, the second device comprising a second wireless access point having a second link to a second service provider network different from the first service provider network.

8. The modem bandwidth burst method of claim 7, the additional communication path comprising a temporary connection between the first wireless access point and the second wireless access point.

9. The modem bandwidth burst method of claim 1, the second device comprising a cell phone connected to a cellular service provider, the cell phone sending the at least one data packet to the first service provider network via the cellular service provider.

10. The modem bandwidth burst method of claim 9, the cell phone operating a tether to form the additional communication path.

11. The modem bandwidth burst method of claim 9, the additional communication path comprising a temporary connection between the first wireless access point and the cell phone.

12. The modem bandwidth burst method of claim 1, the second device comprising a second wireless access point having a second link to the first service provider network, the additional communication path comprising an emergency Wi-Fi channel of an ad-hoc wireless network that operates independently of a conventional Wi-Fi network implemented by the second wireless access point.

13. The modem bandwidth burst method of claim 1, the sending comprising:
    sending a first portion of the data packets using the first link; and
    sending a second portion of the data packets using the additional communication path.

14. The modem bandwidth burst method of claim 1, further comprising disconnecting the additional communication path when additional bandwidth is no longer needed.

15. A wireless access point with bandwidth burst, comprising:
    a processor;
    a memory communicatively coupled with the processor and storing machine readable instructions that, when executed by the processor, cause the processor to:
       receive data packets from one or more devices connected to the wireless access point;
       determine that transmission of the data packets exceed a bandwidth of a first link between the wireless access point and a first service provider network;
       broadcast, from the first wireless access point, a request for temporary bandwidth;

receive, from a second device, an indication of available bandwidth;

in response to the indication of available bandwidth, establish an additional communication path between the wireless access point and a second device; and send at least one, but not all, of the data packets via the additional communication path to the second device for delivery to the first service provider network.

16. The wireless access point of claim 15, the memory further comprising machine readable instructions that, when executed by the processor, cause the processor to detect a limitation of one of an uplink bandwidth of the first link and a downlink bandwidth of the first link.

17. The wireless access point of claim 15, the second device comprising a second wireless access point having a second link to the first service provider network.

18. The wireless access point of claim 17, the additional communication path comprising a temporary connection between the wireless access point and the second wireless access point.

19. The wireless access point of claim 17, the wireless access point and the second wireless access point each connecting with the first service provider using a different one of a wired link, a WiMAX link, a 5G link, and an optical cable link.

20. The wireless access point of claim 15, the second device comprising a second wireless access point having a second link to a second service provider network different from the first service provider network.

21. The wireless access point of claim 20, the additional communication path comprising a temporary connection between the wireless access point and the second wireless access point.

22. The wireless access point of claim 15, the second device comprising a cell phone connected to a cellular service provider, the cell phone sending the at least one data packet to the first service provider network via the cellular service provider.

23. The wireless access point of claim 22, the cell phone operating a tether to form the additional communication path.

24. The wireless access point of claim 22, the additional communication path comprising a temporary connection between the wireless access point and the cell phone.

25. The wireless access point of claim 15, the second device comprising a second wireless access point having a second link to the first service provider network, the additional communication path comprising an emergency Wi-Fi channel of an ad-hoc wireless network, wherein the ad-hoc wireless network operates independently of a conventional Wi-Fi network implemented by the second wireless access point.

26. The wireless access point of claim 15, the machine readable instructions that send at least one of the data packets further comprising machine readable instructions that, when executed by the processor, cause the processor to:

send a first portion of the data packets using the first link; and send a second portion of the data packets using the additional communication path.

* * * * *